US012632757B2

(12) United States Patent
Litinski

(10) Patent No.: US 12,632,757 B2
(45) Date of Patent: May 19, 2026

(54) FIRST-QUANTIZATION BLOCK ENCODING FOR QUANTUM EMULATION

(71) Applicant: PsiQuantum, Corp., Palo Alto, CA (US)

(72) Inventor: Daniel Litinski, Berlin (DE)

(73) Assignee: PsiQuantum, Corp., Palo Alto, CA (US)

( * ) Notice: Subject to any disclaimer, the term of this patent is extended or adjusted under 35 U.S.C. 154(b) by 582 days.

(21) Appl. No.: 18/110,830

(22) Filed: Feb. 16, 2023

(65) Prior Publication Data

US 2023/0297866 A1      Sep. 21, 2023

Related U.S. Application Data

(60) Provisional application No. 63/395,979, filed on Aug. 8, 2022, provisional application No. 63/310,655, filed on Feb. 16, 2022.

(51) Int. Cl.
G06N 10/20 (2022.01)
(52) U.S. Cl.
CPC ..................................... G06N 10/20 (2022.01)
(58) Field of Classification Search
None
See application file for complete search history.

(56) References Cited

U.S. PATENT DOCUMENTS

| 2020/0364601 A1 | 11/2020 | Yamazaki et al. | |
| 2024/0242100 A1* | 7/2024 | Nickerson | H04B 10/70 |
| 2024/0303522 A1* | 9/2024 | Doherty | G06N 10/40 |

OTHER PUBLICATIONS

Su et al., Fault-Tolerant Quantum Simulations of Chemistry in First Quantization; arXiv:2105.12767v1 [quant-ph] May 26, 2021; Total pp. 92 (Year: 2021).*

Gilyen et al., Quantum singular value transformation and beyond: exponential improvements for quantum matrix arithmetics; arXiv:1806.01838v1 [quant-ph] Jun. 5, 2018; Total pp. 67 (Year: 2018).*

Low et al., Optimal Hamiltonian Simulation by Quantum Signal Processing; arXiv:1606.02685v2 [quant-ph] Dec. 20, 2016; Total pp. 6 (Year: 2016).*

Low et al., Hamiltonian Simulation in the Interaction Picture; arXiv:1805.00675v2 [quant-ph] Jun. 6, 2019; Total pp. 30 (Year: 2019).*

(Continued)

*Primary Examiner* — Alan Chen
(74) *Attorney, Agent, or Firm* — Kowert, Hood, Munyon, Rankin & Goetzel, P.C.; Jeffrey C. Hood; Luke Langsjoen

(57)      ABSTRACT

Systems and methods for emulating a physical quantum system with a quantum computation. A model Hamiltonian that approximates a first quantization Hamiltonian of the physical quantum system is stored in memory. The physical system includes a plurality of particles. The first quantization Hamiltonian includes a plurality of first quantization energy operators, and the model Hamiltonian includes a plurality of energy terms corresponding to respective ones of the plurality of first quantization energy operators. Each energy term includes a respective energy operator, a respective energy register operator, and a respective inverse energy operator. The physical quantum system is emulated by performing a quantum computation on a plurality of qubits of the quantum computing system to emulate time evolution using the model Hamiltonian.

20 Claims, 27 Drawing Sheets

---

Determine model Hamiltonian for a physical system that implements an energy cutoff
202

Emulate physical system by performing a quantum computational algorithm using the model Hamiltonian
204

(56) References Cited

OTHER PUBLICATIONS

Costa et al., "Optimal Scaling Quantum Linear-Systems Solver via Discrete Adiabatic Theorem", PRX Quantum; vol. 3, No. 4; Oct. 7, 2022; 54 pages.

Dong An, et al., "Quantum Linear System Solver based on Time-optimal Adiabatic Quantum Computing and Quantum Approximate Optimization Algorithm"; ACM Transactions on Quantum Computing; vol. 3, No. 2, Article 5; New York, NY; 2022; 28 pgs.

Schafer, et al., "Control of Stochastic Quantum Dynamics by Differentiable Programming"; arXiv.org; Apr. 2021; 36 pgs.

International Search Report and Written Opinion; International Application No. PCT/US2024/024280; dated Aug. 30, 2024; 15 pgs.

International Search Report and Written Opinion for PCTUS2023062770 date mailed May 22, 2023, 13 pages.

Yuan Su, et al., "Fault-Tolerant Quantum Simulations of Chemistry in First Quantization", arxiv. org, Cornell University Library, 201 Olin Library Cornell University Ithaca, NY 14853, Oct. 11, 2021, XP091068351, 96 pages.

Cao, Yudong, et al. "Quantum Chemistry in the Age of Quantum Computing"; Arxiv.org, Cornell University Library; Dec. 28, 2018; 194 pgs.

Babbush, Ryan, et al. "Encoding Electronic Spectra in Quantum Circuits with Linear T. Complexity"; Arxiv.org, Cornell University; Sep. 20, 2018; 39 pgs.

International Search Report and Written Opinion; International Application No. PCT/US2024/016242; dated Jun. 14, 2024; 12 pgs.

Bhowmick, et al., "Towards Quantum Dynamics Simulation of Physical Systems: A Survey"; Cornell University; arXiv:2310.11801v1, Oct. 18, 2023; retrieved from <URL: https://arxiv.org/abs/2310.11801>; 37 pgs.

International Search Report and Written Opinion; International Application No. PCT/US2025/011659; mailed Feb. 24, 2026; 11 pgs.

International Search Report and Written Opinion; International Application No. PCT/US2024/057735; mailed Feb. 26, 2026; 12 pgs.

* cited by examiner

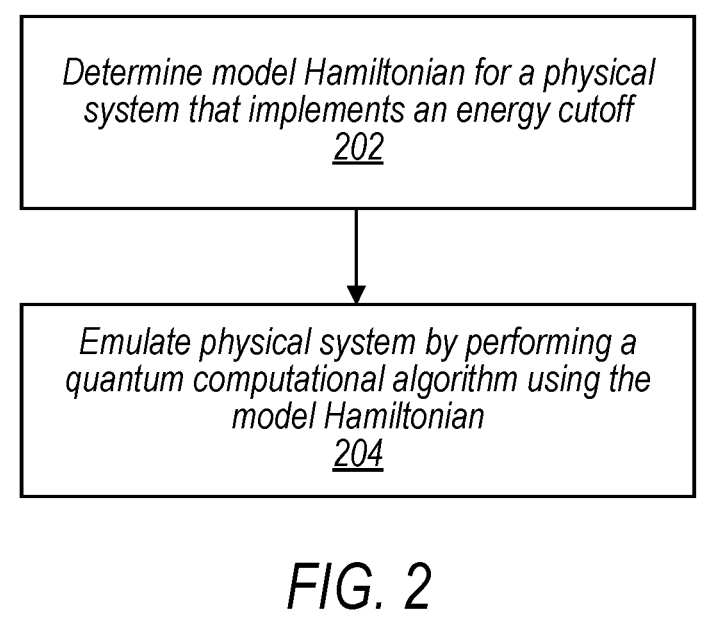

Determine model Hamiltonian for a physical
system that implements an energy cutoff
<u>202</u>

Emulate physical system by performing a
quantum computational algorithm using the
model Hamiltonian
<u>204</u>

*FIG. 2*

$$c = \frac{\pi^2 h^2}{mL^2 E_{unit}}$$

FIRST-QUANTIZATION BLOCK ENCODING FOR QUANTUM EMULATION

PRIORITY INFORMATION

This application claims the benefit of priority to U.S. Provisional Patent Application No. 63/310,655, titled "First-Quantization Block Encoding Algorithm" and filed Feb. 16, 2022, and U.S. Provisional Patent Application No. 63/395, 979, titled "First-Quantization Block Encoding Algorithm" and filed Aug. 8, 2022, both of which are hereby incorporated by reference in their entirety as though fully and completely set forth herein.

TECHNICAL FIELD

Embodiments herein relate generally to quantum computational methods, systems and devices for emulating physical systems.

BACKGROUND

Quantum computing can be distinguished from "classical" computing by its reliance on structures referred to as "qubits." At the most general level, a qubit is a quantum system that may exist in one of two orthogonal states (denoted as $|0\rangle$ and $|1\rangle$ in the conventional bra/ket notation) or in a superposition of the two states (e.g., $$\frac{1}{\sqrt{2}}(|0\rangle + |1\rangle).$$

By operating on a system (or ensemble) of qubits, a quantum computer may quickly perform certain categories of computations that would require impractical amounts of time in a classical computer.

One application of quantum computing is the emulation of physical quantum systems. The quantum system may include a plurality of particles of different types, with differing properties and interactions. Quantum emulation may be an extremely complex and computationally intensive procedure, particularly for more complex systems. Accordingly, improvements in the field of quantum computation are desired to increase the efficiency and reduce the complexity of quantum emulation for physical systems.

SUMMARY

Some embodiments described herein include quantum computing devices, systems, quantum circuits and methods for emulating a physical quantum system using first-quantization block encoding.

In some embodiments, a system stores a model Hamiltonian that approximates a first quantization Hamiltonian of a physical system in a non-transitory computer-readable memory medium. The physical system may include a plurality of particles. The first quantization Hamiltonian includes a plurality of first quantization energy operators, and the model Hamiltonian includes a plurality of energy terms corresponding to respective ones of the plurality of first quantization energy operators. Each energy term comprises a respective energy operator, a respective energy register operator, and a respective inverse energy operator.

An explicit energy cutoff may be implemented for each of the energy terms, or for each of the particles of the physical system.

In some embodiments, the physical system is emulated by performing a quantum computation on a plurality of qubits of the quantum computing system to emulate time evolution using the model Hamiltonian. Alternatively, the quantum computation may perform phase estimation to estimate the ground state energy of the physical system. Emulating the physical system may include constructing a model system that consists of a combination of a wavefunction of the physical system and an energy register. A time evolution operator comprising the model Hamiltonian may then be applied to the model system. Applying the time evolution operator comprising the model Hamiltonian to the model system may involve implementing qubitization to emulate the time evolution of the physical system with a plurality of qubitization operators.

Implementing qubitization may include, for each of the plurality of qubitization operators and for each of the plurality of energy terms applying the respective energy operator to populate the energy register with an energy value, applying the respective energy register operator to extract the energy value from the energy register, and applying the respective inverse energy operator to return the model system to a state prior to application of the respective energy operator.

The techniques described herein may be implemented in and/or used with a number of different types of devices, including but not limited to photonic quantum computing devices and/or systems, hybrid quantum/classical computing systems, and any of various other quantum computing systems.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIG. 2 is a flow chart diagram illustrating a method for emulating a physical quantum system, according to some embodiments:

Figure 1:
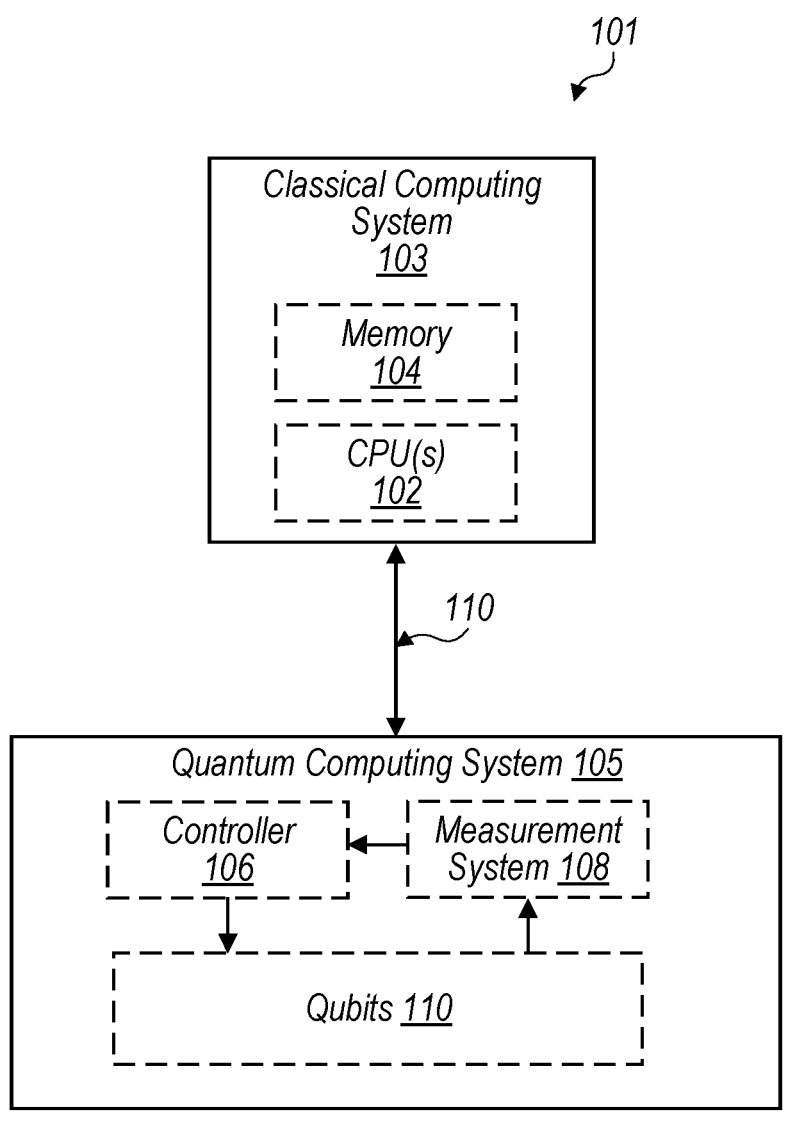
FIG. 1 is a system diagram illustrating a quantum computing system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Disclosed herein are examples (also referred to as "embodiments") of systems and methods for emulating a physical quantum system using various quantum computing systems, including photonic systems.

Although embodiments are described with specific detail to facilitate understanding, those skilled in the art with access to this disclosure will appreciate that the claimed invention may be practiced without these details. Reference will now be made in detail to embodiments, examples of which are illustrated in the accompanying drawings. In other instances, well-known methods, procedures, components, circuits, and networks have not been described in detail so as not to unnecessarily obscure aspects of the embodiments.

Overview of Quantum Computing

To facilitate understanding of the disclosure, an overview of relevant concepts and terminology is provided in the following paragraphs.

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes may be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

Persons of ordinary skill in the art will be able to implement examples using any of a variety of types of quantum systems, including but not limited to photonic systems, solid state system, topological quantum computing systems, hybrid quantum computing systems, among other possibilities.

As used herein, a "qubit" (or quantum bit) is a quantum system with an associated quantum state that may be used to encode information. A quantum state may be used to encode one bit of information if the quantum state space can be modeled as a (complex) two-dimensional vector space, with one dimension in the vector space being mapped to logical value 0 and the other to logical value 1. In contrast to classical bits, a qubit may have a state that is a superposition of logical values 0 and 1. More generally, a "qudit" describes any quantum system having a quantum state space that may be modeled as a (complex) n-dimensional vector space (for any integer n), which may be used to encode n bits of information. For the sake of clarity of description, the term "qubit" is used herein, although in some embodiments the system may also employ quantum information carriers that encode information in a manner that is not necessarily associated with a binary bit, such as a qudit.

Qubits (or qudits) may be implemented in a variety of quantum systems. Examples of qubits include: polarization states of photons: presence of photons in waveguides: or energy states of molecules, atoms, ions, nuclei, or photons. Other examples include other engineered quantum systems such as flux qubits, phase qubits, or charge qubits (e.g., formed from a superconducting Josephson junction): topological qubits (e.g., *Majorana* fermions): or spin qubits formed from vacancy centers (e.g., nitrogen vacancies in diamond).

FIG. 1—Quantum Computing System

FIG. 1 is a system diagram of a quantum computing system, according to some embodiments. As illustrated, the system includes a classical computing system 103 coupled to a quantum computing system 105 over a classical channel 112. The classical channel may relay classical information between the classical and quantum computing systems.

In some embodiments, classical computing system 103 includes one or more non-transitory computer-readable memory media 104, one or more central processing units (CPUs) or processor(s) 102, a power supply, an input/output (I/O) subsystem, and a communication bus or interconnecting these components. The processor(s) 102 may execute modules, programs, and/or instructions stored in memory 104 and thereby perform processing operations. The processor may comprise a dedicated processor, or it may be a field programmable gate arrays (FPGA), an application specific integrated circuit (ASIC), or a "system on a chip" that includes classical processors and memory, among other possibilities. In some embodiments, memory 104 stores one or more programs (e.g., sets of instructions) and/or data structures and is coupled to the processor(s).

The classical computing system may be classical in the sense that it operates computer code represented as a plurality of classical bits that may take a value of 1 or 0. Programs may be written in the form of ordered lists of instructions and stored within the classical (e.g., digital) memory 104 and executed by the classical (e.g., digital) processor 102 of the classical computer. The memory 104 is classical in the sense that it stores data and/or program instructions in a storage medium in the form of bits, which have a single definite binary state at any point in time. The processor may read instructions from the computer program in the memory 104 and/or write data into memory, and may optionally receive input data from a source external to the computer 103, such as from a user input device such as a mouse, keyboard, or any other input device. The processor 102 may execute program instructions that have been read from the memory 104 to perform computations on data read from the memory 104 and/or input from the quantum computing system, and generate output from those instructions. The processor 102 may store that output back into the memory 104.

The quantum computing system 105 may include a plurality of qubits and a controller 106 configured to interface with a plurality of qubits 110. The qubits may be configured to evolve in time under the directed influence of the controller, and a measurement system 108 may at times perform quantum measurements on all or a subset of the qubits to obtain quantum measurement results in the form of classical data bits (e.g., ones and zeros). The classical data from the measurement results may be intermediate results that inform behavior of the classical computing system and/or the quantum controller 106 during a quantum computation, and they may additionally include classical results of the quantum computation. The measurement results may be communicated to the classical computing system and/or the controller 106, and further the classical computing system may provide directions and/or instructions to the controller 106 and the measurement system 108 to guide the behavior of the quantum computing system to perform a quantum computation. For example, the classical computing system 103 may provide classical data signals used for quantum state preparation within the quantum computing system 105, in response to which the controller may prepare the states of the qubits 110 into a desired initial state for a particular quantum computation.

First Quantization Block Encoding

Embodiments herein describe quantum computational systems and methods for emulating a physical system. The described embodiments improve on previous quantum computational methods by reducing the quantity of classical numbers that are loaded during the computation, which in many cases introduces a bottleneck to the computation. As described in greater detail below; an explicit per-particle energy cutoff $E_{cutoff}$ is also introduced to expedite the computation.

Efforts to improve the efficiency of quantum computations often focus on reducing what is called the computational spacetime volume utilized in executing a specific quantum computation. As used herein, the computational spacetime volume is a metric proportional to, for a particular quantum computation, the number of hardware components multiplied by the computational time, e.g., the number of physical superconducting qubits multiplied by the duration of the computation, or alternatively the number of photonic resource-state generators multiplied by the duration of the computation. The computational spacetime volume corresponding to a specific sequence of operations of a particular quantum computation generally depends on the architecture of the quantum computer. The types of architectures that are primarily considered in the optimization of fault tolerant computations are those in which quantum computations are described as sequences of Clifford gates (Controlled-NOT gates, Hadamard gates and phase gates) and T gates, and the computational spacetime volume is proportional to the number of logical qubits used by the computation multiplied by the number of T gates. Accordingly, optimization of quantum simulation computations often focuses on the reduction of the number of qubits and the number of T gates (or Toffoli gates) utilized to execute a quantum computation.

However, it is possible to construct different architectures for fault-tolerant quantum computers which execute quantum computations more efficiently, i.e., with lower spacetime volume and a different cost function. For example, in some embodiments, the cost does not solely depend on the number of elementary T gates and Toffoli gates, but also depends on the specific subroutines containing these gates. Specifically, arithmetic operations such as quantum addition and multiplication may be executed significantly more efficiently than so-called quantum read-only memory (QROM) circuits that are used to load data into the quantum computer via a quantum-circuit implementation of a lookup table. In some embodiments, rather than reducing the computational cost by reducing the number of qubits, T gates and Toffoli gates, the computational cost may be reduced through the reduction of arithmetic and the avoidance of data loading (QROM) circuits, as the per-Toffoli cost of QROM circuits may in some circumstances be several orders of magnitude higher than the cost of arithmetic such as quantum addition. As described in greater detail below, this is achieved in part by performing the quantum computation using a first quantization Hamiltonian, in some embodiments.

In a quantum simulation, the system of interest (such as a molecule or crystal lattice) may be described in different ways, e.g., in "first quantization" or "second quantization". In first quantization, the space that is being simulated is partitioned into grid cells, such that each qubit register is associated with a particle and a grid coordinate. In second quantization, the space is partitioned into a small number of "orbitals" that are relevant to the simulated system. Each qubit is associated with an orbital, where the qubit state (0 or 1) indicates the occupation of the orbital, i.e., whether a particle is found in the orbital. The number of qubits utilized to describe a specific system is typically lower in second quantization. Therefore, it is typically the preferred method when minimizing the number of qubits. However, the description of the system is substantially simpler in first quantization than in second quantization. In first quantization, the Hamiltonian describing the system in many cases is just the kinetic energy term $p^2/2m$ plus the Coulomb potential energy. On the other hand, in second quantization, the Hamiltonian is a sum of a large number (often millions) of Hamiltonian terms with different coefficients that are computed on a classical computer before the simulation is executed on a quantum computer. These numbers (of which there are potentially millions) are accessed by the quantum computer in every step of the simulation using a data loading (QROM) circuit. As one example, a 100-orbital Hamiltonian may contain $\sim 100^4 = 100$ million Hamiltonian terms of the form $$c_i^\dagger c_j^\dagger c_k c_l,$$

where $c^\dagger$ and $c$ are fermionic creation and annihilation operators and $i$, $j$, $k$, and $l$ are orbital labels between 1 and 100. Each one of those terms comes with a different prefactor that would be loaded into the quantum computer in each step of the simulation in a second quantization computational method. Contrariwise, the only Hamiltonian coefficients in a first-quantized Hamiltonian are the two prefactors of the kinetic and potential energy terms.

Previous implementations focused on improving the number of T gates utilized to load these numbers into the quantum computer efficiently. Therefore, the second quantization approach currently yields the lowest cost in terms of volume counted as number of qubits multiplied by number of T gates. However, these methods rely heavily on QROM circuits. Methods employed according to some embodiments described herein implement a first-quantization quantum simulation using only arithmetic subroutines (such as adders) without the use of QROM circuits, or with a reduced usage of QROM circuits, which may significantly increase the efficiency of a quantum computation. This may lead to a larger number of qubits and T gates compared to existing second-quantization approaches, but in an architecture where the computational cost does not depend (or primarily depend) on the number of qubits and where adders are significantly cheaper than QROMs, the overall cost may still be lower.

Figure 6:
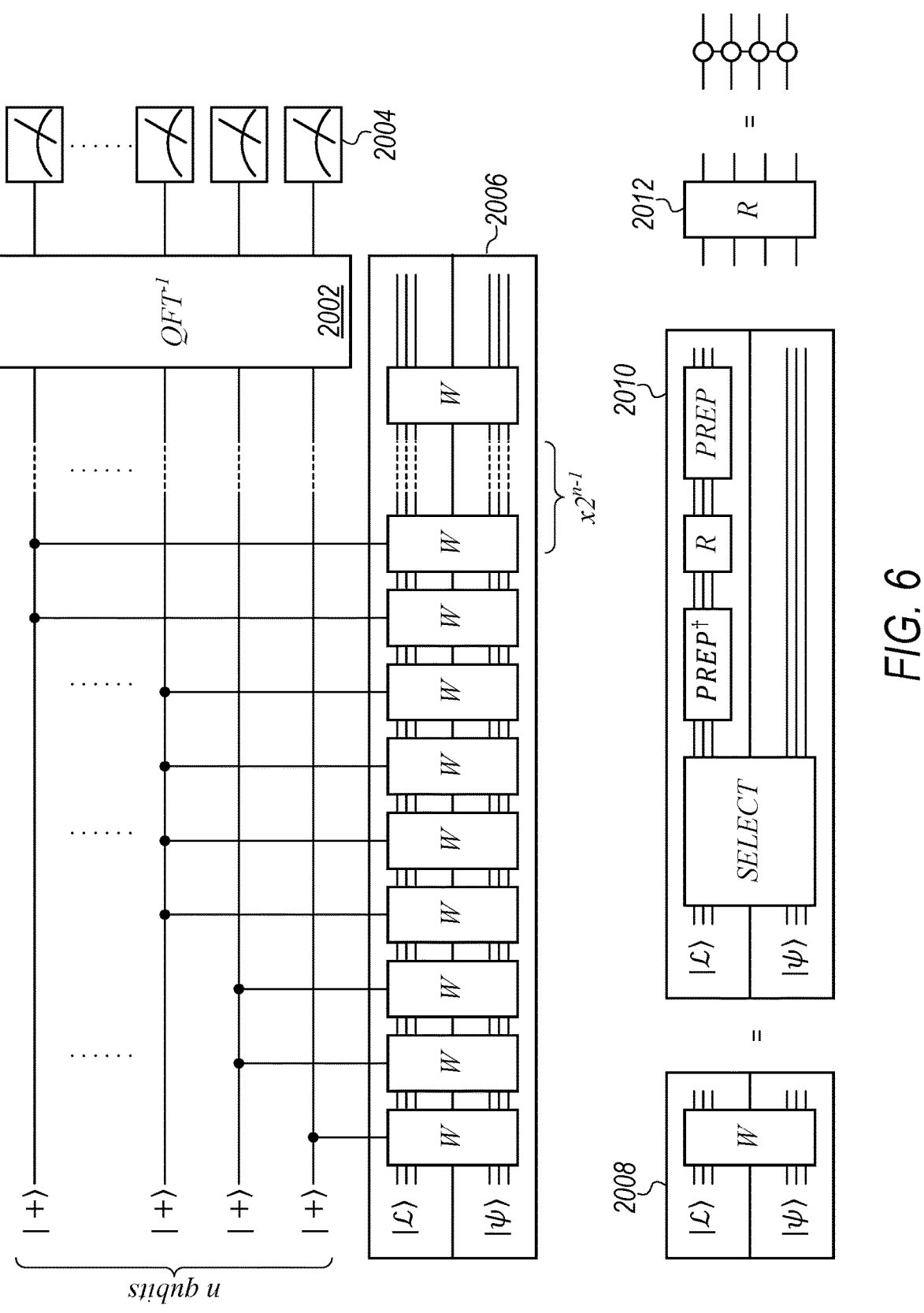
FIG. 6 is a quantum circuit diagram illustrating a qubitization circuit for phase estimation, according to some embodiments.

Note that as used herein, a "gate" refers to a quantum circuit configured to perform a particular operation or subroutine on one or more qubits. Gates may exist hierarchically, e.g., a gate may itself contain one or more sub-gates, as illustrated in FIG. 6 for the gate W. In some embodiments, the qubits may include register qubits that serve as a "workspace" to store working information related to the computation, and state simulation qubits to simulate the state of the quantum system. A series of quantum circuit operations may be performed on the qubits, and a subset of the qubits are then measured to produce classical measurement results to calculate the desired outcome (e.g., the ground state energy, or a time-evolved state of the quantum system).

First Quantization Hamiltonian

In some embodiments, Hamiltonians of systems of $\eta$ particles with two-body interactions are block encoded in the first quantization using $\mathcal{O}(\eta \cdot \log N)$ qubits and $\mathcal{O}(\eta^2 \cdot E_{cutoff} \cdot t \cdot \text{poly} \log(N))$ operations for time evolution with time $t$ or phase estimation of an energy $\sim 1/t$. Here, N is the number of orbitals and $E_{cutoff}$ is a per-particle high-energy cutoff describing the maximum per-particle kinetic and potential energy below which the simulation is accurate (such that $\eta \cdot E_{cutoff}$ is the total cutoff energy). The per-particle cutoff energy may be chosen independently from other parameters and generally may not scale with $\eta$. Advantageously, the described embodiments provide a polynomial improvement in the scaling with $\eta$ and an exponential improvement in the scaling with N compared to existing first-quantization qubitization computations, which scale as $\mathcal{O}(\eta^{8/3} \cdot \text{poly}(N))$. Furthermore, the described methods are parallelizable, as each qubitization step has a depth of $\mathcal{O}(\log N \cdot \log \eta)$. Advantageously, the described methods use only simple arithmetic operations and have the potential to be applied in a wide variety of simulations and physical systems, including the simulation of Coulomb-interacting electrons and nuclei, Coulomb-interacting ions with frozen core electrons, and interacting particles coupled to a heat bath, among other possibilities.

Hamiltonian for Coulomb-Interacting Particles

The Hamiltonian describing a physical system of Coulomb-interacting particles may consist of two types of terms:

$$H = \sum_{particles\,i} \frac{\vec{p}_i^2}{2m_i} + \sum_{particles\,i,j} \frac{1}{8\pi\varepsilon_0} \frac{q_i q_j}{|\vec{r}_i - \vec{r}_j|}. \tag{18}$$

From this expression, one would expect that all it takes to encode this Hamiltonian on a quantum computer are addition, multiplication, switching between the position and momentum bases (e.g., a Fourier transform), and applying the function $f(x,y) = 1/|x-y|$.

However, methods in the literature typically use much more complicated operations. For example, computational methods that use second quantization lose the simplicity of the Hamiltonian by translating it into a sum of many $$c_i^\dagger c_j$$

and $$c_i^\dagger c_j^\dagger c_k c_l$$

terms, where $$c_i^\dagger$$

and $c_j$ are creation and annihilation operators, respectively, that require a large quantity of numbers to describe the coefficients. Other methods that use first quantization may have a higher complexity because they operate either in only the position or momentum basis and accordingly, involve loading many classical numbers into the quantum computer.

In some embodiments, a computational method is described that utilizes standard arithmetic operations to block-encode a Hamiltonian of a system of interacting particles. These particles may be electrons and nuclei, or the methods may be applied more generally to other types of particles and combinations of types of particles. For example, two non-limiting possibilities are 1) the replacement of nuclei and core electrons with ions that have frozen core electrons and 2) the addition of a heat bath for the simulation of open system dynamics (for example, in the preparation of finite-temperature states or the measurement of dissipative effects).

The proposed methods exhibit improved asymptotic scaling compared to previous implementations. These improvements may be facilitated by introducing a high-energy cutoff $E_{cutoff}$ to the Hamiltonian. Instead of simulating the Hamiltonian H, a different Hamiltonian $\tilde{H}$ is simulated. The Hamiltonian $\tilde{H}$ is equivalent to H for states that are superpositions of momentum eigenstates in which each particle has a kinetic energy below $E_{cutoff}$, and superpositions of position eigenstates in which each particle has a total potential energy below $E_{cutoff}$.

For example, a 3D system consisting of $\eta$ interacting electrons and nuclei may have a Hamiltonian of the following form:

$$H = \sum_{i=1}^{\eta} E_{kin}^{(i)} + E_{pot}^{(i)} \tag{19}$$

$$E_{kin}^{(i)} = \frac{p_{i,x}^2 + p_{i,y}^2 + p_{i,z}^2}{2m_i} \tag{20}$$

$$E_{pot}^{(i)} = \sum_{j \neq i}^{\eta} \frac{q_i q_j}{8\pi\varepsilon_0} \frac{1}{\sqrt{(x_i - x_j)^2 + (y_i - y_j)^2 + (z_i z - _j)^2}}, \tag{21}$$

where $$E_{kin}^{(i)} \text{ and } E_{pot}^{(i)}$$

are the kinetic and potential energy of particle i. The state of the $\eta$-electron system will be referred to herein as $|\psi\rangle_{system}$.

Instead of block-encoding the Hamiltonian H specified above, a slightly different Hamiltonian $\tilde{H}/\lambda$ is block encoded that acts on a slightly larger system described by a state $|\psi\rangle_{system} \otimes |c\rangle_n$, where $c \in [-2^{b_e - 1}, 2^{b_e - 1} - 1]$ and $|c\rangle_n$ is a $b_e$-qubit register, which is referred to herein as the energy register. The "double number" operator $2\tilde{N}$ is defined as:

$$2\tilde{N}|c\rangle_n = 2c|c\rangle_n \tag{22}$$

The double number operator $2\tilde{N}$ is also referred to herein as the energy register operator, as it acts to extract a scalar value for the energy from the energy register. Note that c does not have units of energy, it is simply an integer, hence each full model Hamiltonian term additionally includes the multiplicative factor $E_{unit}$ to obtain the correct energy magnitude. This is why the operator $2\tilde{N}$ and the register $|c\rangle_n$, may also be referred to as a double number operator and a number register, respectively. To avoid confusion, we refer to them herein as the energy register operator and the energy register, respectively. If we write $|c\rangle_n$, as a register of $b_e$ qubits $$|c\rangle_n = |c_{b_e - 1}\rangle |c_{b_e - 2}\rangle \dots |c_1\rangle |c_0\rangle \tag{23}$$

and assume that the integer c is encoded in $b_e$ bits using the two's complement representation, then $2\hat{N}$ may be written as a sum of Z Pauli operators on the $b_e$ qubits as:

$$2\hat{N} = 2^{b_e - 1} Z_{b_e - 1} - \sum_{i=0}^{b_e - 2} 2^i Z_i - 1. \tag{24}$$

Furthermore, we define the operators $$U_{kin}^{(i)}|p_1, p_2, \dots, p_\eta\rangle_{system} \otimes |0\rangle_n = \tag{25}$$
$$|p_1, p_2, \dots, p_\eta\rangle_{system} \otimes |R(E_{kin}^{(i)}/2)\rangle_n$$

and $$U_{pot}^{(i)}|r_1, r_2, \dots, r_\eta\rangle_{system} \otimes |0\rangle_n = |r_1, r_2, \dots, r_\eta\rangle_{system} \otimes |R(E_{pot}^{(i)}/2)\rangle_n. \tag{25}$$

Here, $|p_1, p_2, \dots, p_\eta\rangle_{system}$ system and $|r_1, r_2, \dots, r_\eta\rangle_{system}$ system are momentum and position eigenstates of the $\eta$-particle system. $R(\in)$ is a function that discretizes the energy and applies a cutoff:

$$R(\epsilon) = \begin{cases} 2^{b_e - 1} - 1 & \text{if } \epsilon \geq E_{cutoff}/2 \\ -2^{b_e - 1} & \text{if } \epsilon < -E_{cutoff}/2 \\ \text{round}\left(\dfrac{\epsilon}{E_{unit}}\right) & \text{else} \end{cases} \tag{26}$$

where $E_{unit} = E_{cutoff}/2^{b_e}$. In other words, R(E) expresses the energy e in integer units of $E_{unit}$, and applies a high-energy cutoff, if $|\epsilon| \geq 2^{b_e} E_{unit}$. A kinetic energy operator with a high-energy cutoff may then be defined as $$\tilde{E}_{kin}^{(i)} = E_{unit} \cdot U_{kin}^{(i)\dagger} \cdot 2\hat{N} \cdot U_{kin}^{(i)} \tag{27}$$

and a potential energy operator with a high-energy cutoff as $$\tilde{E}_{pot}^{(i)} = E_{unit} \cdot U_{pot}^{(i)\dagger} \cdot 2\hat{N} \cdot U_{pot}^{(i)} \tag{28}$$

Finally, we define the Hamiltonian $$\tilde{H} = \sum_{i=1}^{\eta} \tilde{E}_{kin}^{(i)} + \tilde{E}_{pot}^{(i)}. \tag{29}$$

This new Hamiltonian $\tilde{H}$ approximates the original Hamiltonian H as $$\lim_{b_e \to \infty, E_{cutoff} \to \infty} \tilde{H}(|\psi\rangle_{system} \otimes |0\rangle_h) = (H|\psi\rangle_{system}) \otimes |0\rangle_h. \tag{30}$$

With a finite cutoff energy, A will approximate the original Hamiltonian as long as $|\psi\rangle_{system}$ is a superposition of momentum eigenstates with per-particle kinetic energies below $E_{cutoff}$, and a superposition of position eigenstates with per-particle potential energies below $E_{cutoff}$. This may be the case, e.g., for sufficiently low-momentum wave packets that are sufficiently localized such that the total Coulomb attraction of each particle (balanced by the Coulomb repulsion) is not too large.

$\tilde{H}$ may be written as a sum of Pauli operators with equal coefficients as follows:

$$\tilde{H} = E_{unit} \cdot \sum_{i=1}^{\eta} \left( U_{kin}^{(i)\dagger} \cdot 2\hat{N} \cdot U_{kin}^{(i)} + U_{pot}^{(i)\dagger} \cdot 2\hat{N} \cdot U_{pot}^{(i)} \right), \tag{31}$$

$$2\hat{N} = -1 - Z_0 - Z_1 - Z_1 - Z_2 - Z_2 - \tag{32}$$

$$Z_2 - Z_2 - \cdots - Z_{b_e-2} + Z_{b_e-1} + Z_{b_e-1} + \cdots + Z_{b_e-1}.$$

Here, $\tilde{H}$ is a sum of $2\eta \cdot 2^{b_e}$ Pauli terms, each with a coefficient $E_{unit} = E_{cutoff}/2^{b_e}$. Notice that the eigenenergies of A are between $-2\eta \cdot E_{cutoff}$ and $+2\eta \cdot E_{cutoff}$. They are not necessarily as big as $2\eta \cdot E_{cutoff}$, but they are found within this interval. For qubitization, we may block-encode operators that have eigenvalues between $-1$ and $+1$. Therefore, in the following, we will be block-encoding the rescaled Hamiltonian $\tilde{H}/\lambda$ with $\lambda = 2\eta \cdot E_{cutoff}$.

FIG. 2—Flowchart for Quantum Emulation

FIG. 2 is a flowchart diagram illustrating a method for emulating a physical quantum system. The method shown in FIG. 2 may be used in conjunction with any of the computer systems or devices shown in the above Figures, among other devices. For example, the method shown in FIG. 2 may be performed by a hybrid or quantum computing device or system 101 as illustrated in FIG. 1. The quantum computing system may be configured to direct the described method steps, and may include (or be coupled to) a classical computing system 103 for processing classic information and directing operations of the quantum computing device. In some embodiments, the described quantum circuit may be implemented in any of a variety of types of quantum computing systems, including but not limited to photonic, semiconductor, superconducting and/or topological quantum computing systems. The quantum computing system may be configured to direct the described method steps, and may include (or be coupled to) a classical computing system 103 for processing classic information and directing operations of the quantum computing device. It is to be understood this method may be used by any of a variety of types of quantum computing architectures, and these other types of systems should be considered within the scope of the embodiments described herein. As illustrated, the method shown in FIG. 2 may proceed as follows.

At 202, a model Hamiltonian that approximates a first quantization Hamiltonian of a physical system is stored in a non-transitory computer-readable memory medium. An example form of the Hamiltonian is shown in Eqs. 29 and 31-32. The model Hamiltonian converges to the first quantization Hamiltonian in the limit that the quantization size and energy cutoff go to infinity, as shown in Eq. 30.

The physical system may include a plurality of quantum mechanical particles. In various embodiments, the physical system may be a system of one or more distinct sets of identical Coulomb-interacting particles: a system of Coulomb-interacting ions with frozen core electrons, valence electrons, and/or free electrons: or a system of interacting particles coupled to a heat bath, among other possibilities. The physical system may be emulated using a plurality of qubits prepared in an initial state that represents a combination of the wavefunction of the system and an energy register $|c\rangle_h$, as described above.

The first quantization Hamiltonian may include a plurality of first quantization energy operators, as shown in Eq. 19. For example, the first quantization Hamiltonian may include a plurality of first quantization kinetic energy operators corresponding to each of a plurality of particles of the physical system (Eq. 20) and a plurality of first quantization potential energy operators corresponding to pairwise interactions between respective pairs of particles of the physical system (Eq. 21).

The model Hamiltonian may include a plurality of energy terms corresponding to respective ones of the plurality of first quantization energy operators. For example, each of the first quantization energy operators of the first quantization Hamiltonian may have a respective corresponding energy term in the model Hamiltonian. Each energy term may include a respective energy operator, a respective energy register operator, and a respective inverse energy operator, as shown in Eq. 31. The energy operators may include kinetic energy operators corresponding to respective particles of the plurality of particles and potential energy operators that correspond to interaction energies between respective pairs of the plurality of particles.

In some embodiments, the model Hamiltonian may discretize an energy of the full Hamiltonian and implement an energy cutoff on each of the plurality of particles of the physical system. An example form of the energy cutoff function is shown in Eq. 26. The energy cutoff may include both a maximum potential energy and a maximum kinetic energy for each of the plurality of particles of the physical system. Advantageously, the energy cutoff may be a tunable parameter that may dramatically increase the speed of a quantum computation (e.g., by reducing the Hilbert space of energy states), and the energy cutoff may also be set to a level that captures essential dynamics of the system (i.e., reducing an error magnitude that results from the cutoff). Previous implementations have failed to incorporate an explicit energy cutoff, and have instead discretized space and time to implicitly limit the energies that contribute to the computation. Embodiments herein improve on these implementations by explicitly incorporating a per-particle (or per-term in the model Hamiltonian) energy cutoff as a tunable parameter that may be modified to better accommodate the specific circumstances of a particular computation.

Figure 4:
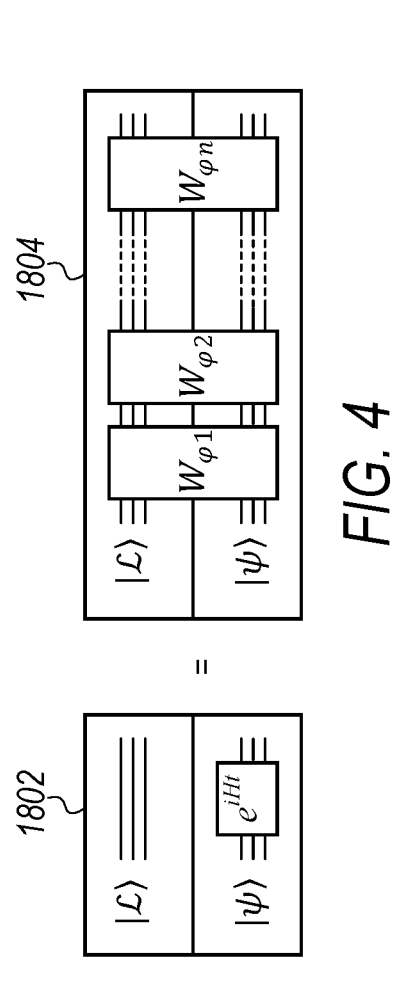
FIG. 4 is a quantum circuit diagram illustrating a decomposition of a time evolution operator into a plurality of qubitization operators, according to some embodiments.

In some embodiments, time evolution of the model Hamiltonian is modelled as a plurality of qubitization operators, as shown in FIG. 4. The time evolution of the physical system may be modelled by operating a sequence of qubitization operators $W_\varphi$ on the modelled system. The decomposition of each qubitization operator into SELECT, prepare inverse (PREP†), energy cutoff ($R_\varphi$), and prepare (PREP) subroutines, as well as the details of these subroutines, are described in greater detail below.

In some embodiments, a relationship between the energy cutoff, an energy uncertainty of the model Hamiltonian, and a number of repetitions of a qubitization operator of the quantum computation is determined. In these embodiments, the energy cutoff may be determined based at least in part on the energy uncertainty and the number of repetitions of the qubitization operator. For example, the energy cutoff may be selected to balance an acceptable level of energy uncertainty (e.g., a level of energy uncertainty below an uncertainty threshold) and a desired number of repetitions of the qubitization operator (e.g., to keep the run time of the computation within a threshold time duration).

At 204, the physical system is emulated by performing a quantum computation on a plurality of qubits of the quantum computing system to emulate time evolution using the model Hamiltonian. In some embodiments, emulating the physical system involves constructing a model system that includes a combination of a wavefunction of the physical system and an energy register. The model system may be constructed by preparing a plurality of qubits in respective initial states, for example according to the different qubit registers shown in FIG. 3 and/or FIG. 7 . . . . A time evolution operator constructed based on the model Hamiltonian may then be applied to the model system to emulate the physical system.

In some embodiments, applying the time evolution operator to the model system may involve implementing qubitization to emulate the time evolution of the physical system with a plurality of qubitization operators. Implementing qubitization may involve, for each of the plurality of qubitization operators and for each of the plurality of energy terms, applying the respective energy operator to populate the energy register with an energy value, applying the respective energy register operator to extract the energy value from the energy register, and applying the respective inverse energy operator to return the model system to a state prior to application of the respective energy operator.

Figure 7:
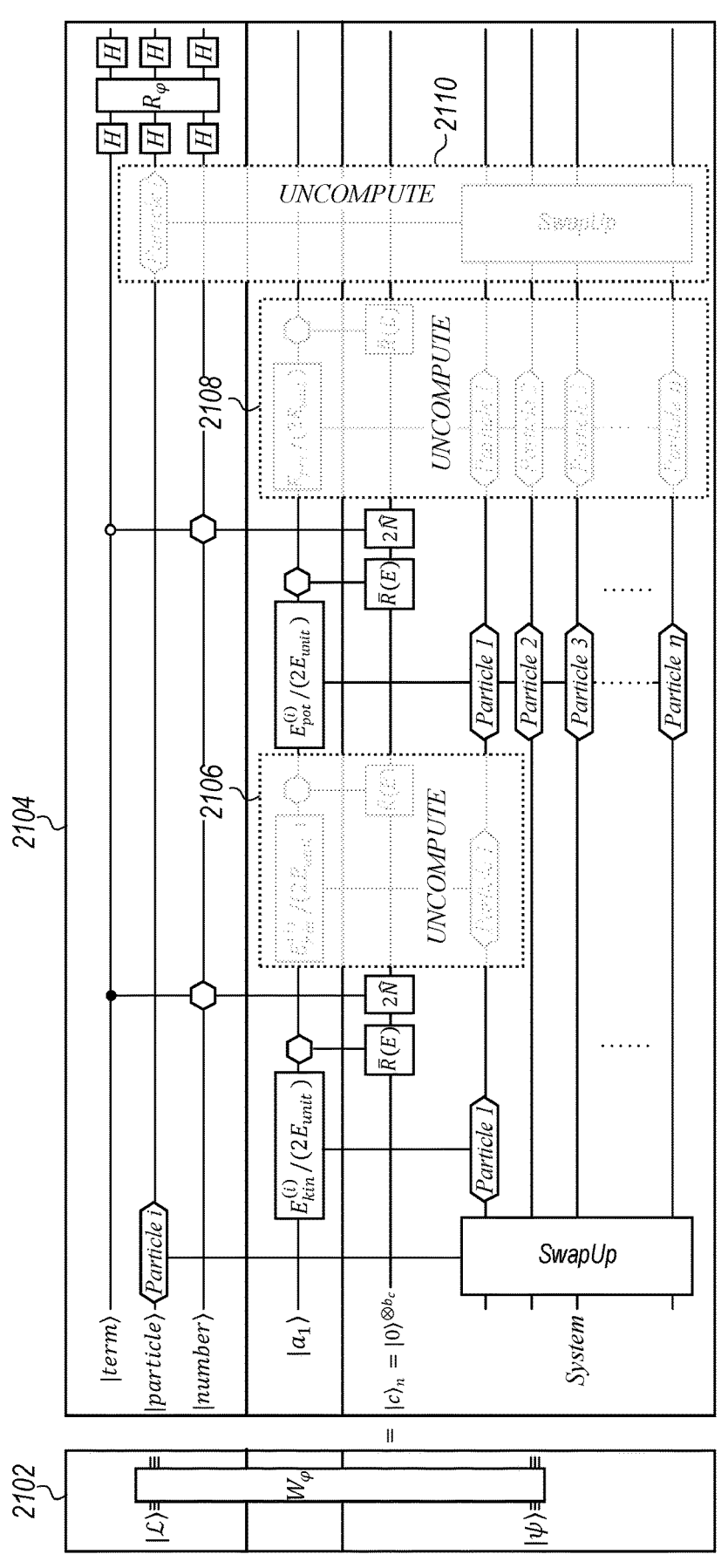
FIG. 7 is a detailed schematic diagram illustrating a circuit for implementing a qubitization operator to emulate time evolution, according to some embodiments.

A detailed quantum circuit diagram illustrating operation of a qubitization operator for emulating time evolution is shown in FIG. 7. As illustrated, first a SwapUp subroutine is operated on the system to swap the $i^{th}$ particle up to the first particle register. Next, the kinetic energy term operates on the $i^{th}$ particle state in the first register to extract the particle's kinetic energy. The energy cutoff is applied to the energy, the energy is stored in the energy register ("number>"), and an inverse kinetic energy operator is applied to return the $i^{th}$ state to the state it was in before operation of the kinetic energy operator. An analogous procedure then occurs for the potential energy, where the potential energy associated with the $i^{th}$ particle is computed, an energy cutoff is applied, the potential energy is stored in the energy register, and the inverse potential energy operator is applied to return the $i^{th}$ state to its original state.

In other embodiments, a phase estimation circuit may operate on the state of the system to estimate a ground state energy of the physical system, as shown in the quantum circuit illustrated in FIG. 6. During phase estimation, the qubitization operators W may be phase independent.

Additional Technical Detail

The following numbered paragraphs provide additional technical detail and description regarding embodiments herein.

Figure 3:
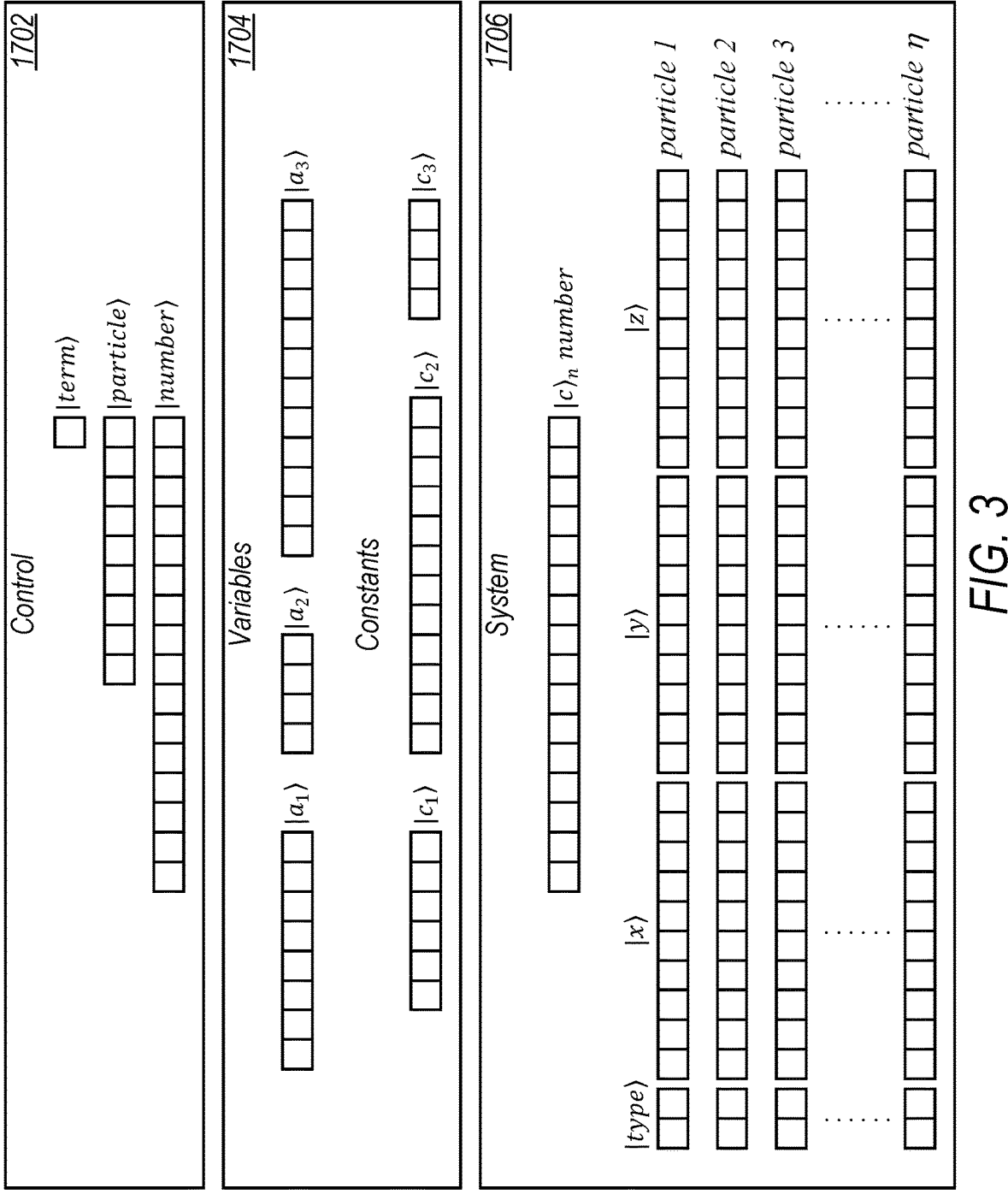
FIG. 3 illustrates an example of qubit allocation for a quantum computation within different registers, according to some embodiments.

FIG. 3—Qubit Allocation

FIG. 3 illustrates an example of qubit allocation for a quantum computation within different registers. As illustrated, qubits are allocated for control (i.e., for encoding the Hamiltonian), variables, constants, and to representing the physical system. Qubitization involves preparing a state $|\mathcal{L}\rangle$ that encodes the coefficients of the Hamiltonian. In our case, the Hamiltonian contains $2 \cdot \eta \cdot 2^{b_e}$ coefficients, so that $|\mathcal{L}\rangle = |+\rangle^{\otimes n_\mathcal{L}}$ with $n_\mathcal{L} = 1 + \log(\eta) + b_e$. We split these $n_\mathcal{L}$ qubits into one qubit called $|\text{term}\rangle$ (which selects between kinetic and potential energy terms), a $\log(\eta)$-qubit register called $|\text{particle}\rangle$ and a $b_e$-qubit register called $|\text{number}\rangle$ (see 1702).

The state of the system 1706 is stored in $4\eta$ registers. Each set of $4\eta$ registers contains three registers $|x\rangle$, $|y\rangle$ and $|z\rangle$ for storing the position of the particle, and an additional $|\text{type}\rangle$ register to indicate the particle type. We will assume that our 3D system of size $L \times L \times L$ has periodic boundary conditions and is partitioned into $2^{b_l} \times 2^{b_l} \times 2^{b_l}$ grid cells of size $l_{unit} \times l_{unit} \times l_{unit}$, where the length unit is $l_{unit} = L/2^{b_l}$. The $|x\rangle$, $|y\rangle$ and $|z\rangle$ registers then store $b_l$-qubit numbers in a two's complement representation, such that x, y, z∈ $[-2^{b_l-1}, 2^{b_l-1}-1]$ can represent positions between $-L/2$ and $+L/2$.

The $|\text{type}\rangle$ register indicates the particle type of each particle, e.g., an electron, a nucleus with charge 4e, a nucleus with charge 6e, a photon, etc. For example, if the system consisted of electrons, lithium nuclei, fluorine nuclei and phosphorus nuclei (as is the case for $LiPF_6$), there would be 4 types of particles, so the $|\text{type}\rangle$ register would contain two qubits. In general, log $n_{types}$ qubits are required to encode $n_{types}$ different particle types. In a system where the electron spin is important, spin-up and spin-down electrons can be labeled by different types.

There is also the $|c\rangle_h$ register corresponding to the energy register of the approximated Hamiltonian. It is initialized in $|0\rangle^{\otimes b_e}$, so it is, in principle, not utilized, but is merely kept to make the method easier to understand. Finally, there are a number of variables and constants 1704 that are used during the computation. Variables are initialized in $|0\rangle^{\otimes n}$ and are used in the different subroutines. Constants are qubits that are initialized in a specific state at the beginning of the computation. There may be additional ancilla qubits that are used to perform various arithmetic operations, but these are not always shown in the circuit.

Qubitization to Emulate Time Evolution

Qubitization is a framework for developing a variety of types of quantum computations. For embodiments described herein, qubitization is employed exclusively in the context of emulating time evolution and phase estimation. With qubitization (or more accurately, quantum signal processing), a time evolution operator may be written as a sequence of operators $W_\varphi$, as shown in FIG. 4, where the time evolution of the state as shown in 1802 is decomposed as a sequence of $W_\varphi$ operators as shown in 1804.

Figure 5:
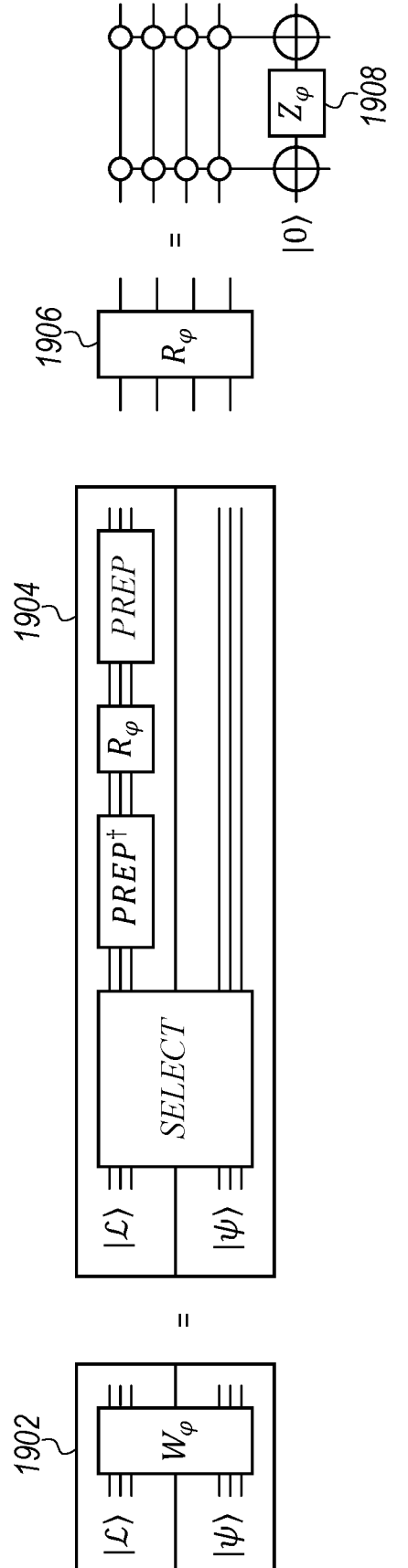
FIG. 5 is a quantum circuit diagram illustrating the component subroutines of a qubitization operator, according to some embodiments.

$W_\varphi$ are referred to herein as "qubitization operators". The circuit shown in FIG. 4 time-evolves the state $|\psi\rangle$ with a Hamiltonian $$H = \sum_{i=1}^{n} \alpha_i U_i,$$

which is a linear combination of unitary operators $U_i$ with real coefficients $\alpha_i > 0$. In addition, it makes use of a state $$|\mathcal{L}| = \lambda^{-1} \sum_{i=1}^{n} \sqrt{\alpha_i} |i\rangle$$

where the real number $$\lambda = \sum_{i=1}^{n} \alpha_i$$

normalizes the state. Time evolution with time t and target error $\in$ may be performed using a sequence of $\mathcal{O}(\lambda \cdot t + \log (1/\in))$ qubitization operators, where the phases (i.e., angles) $\varphi_i$ depend on the Hamiltonian (and time) and may be computed beforehand. The total number of phases $\varphi_i$ in a particular computation generally scales linearly with both the duration of time t in the time evolution, and it also increases as the energy cutoff is increased. The $W_\varphi$ operators may be further decomposed into SELECT and PREPARE subroutines, as shown in FIG. 5. The SELECT subroutine applies the unitary operators $U_i$ to the $|\psi\rangle$ register (or "system register") controlled on the $|\mathcal{L}\rangle$ register (or "control register"), where SELECT=$\Sigma_i |i\rangle\langle i|_{L} \otimes (U_i)_{|\psi\rangle}$ PREP is a subroutine that prepares the $|\mathcal{L}\rangle$ state, where PREP$|0\rangle^{\otimes n_\mathcal{L}} = |\mathcal{L}\rangle$ The $R_\varphi$ operator 1906 applies a Z-rotation 1908 of magnitude $\varphi$ when each of the input qubits to $R_\varphi$ is zero.
FIG. 6—Phase Estimation Circuit In some embodiments, the circuit for phase estimation (e.g., to estimate the ground-state energy of a Hamiltonian H) is similar in some respects to the qubitization circuit for emulating time evolution, and is shown in FIG. 6. Estimating an energy with an error of $\in$, phase estimation of an energy E with an additive error $\in_{add}$ utilizes $\mathcal{O}(\lambda/\in_{add})$ controlled-W operations, or $\mathcal{O}(\lambda/\in_{rel}(1/E))$ operations for a relative error $\in_{add}$. Here, W are qubitization operators where the subscript $\varphi_i$ has been removed and W implements a constant phase of $\varphi = \pi/2$. In other words, rather than implementing qubitization operators with a unique sequence of phases $\varphi_i$, a sequence of equivalent qubitization operators with $\varphi = \pi/2$ is implemented. The circuit for the R operator is illustrated at 2012 in FIG. 6.

Figure 8:
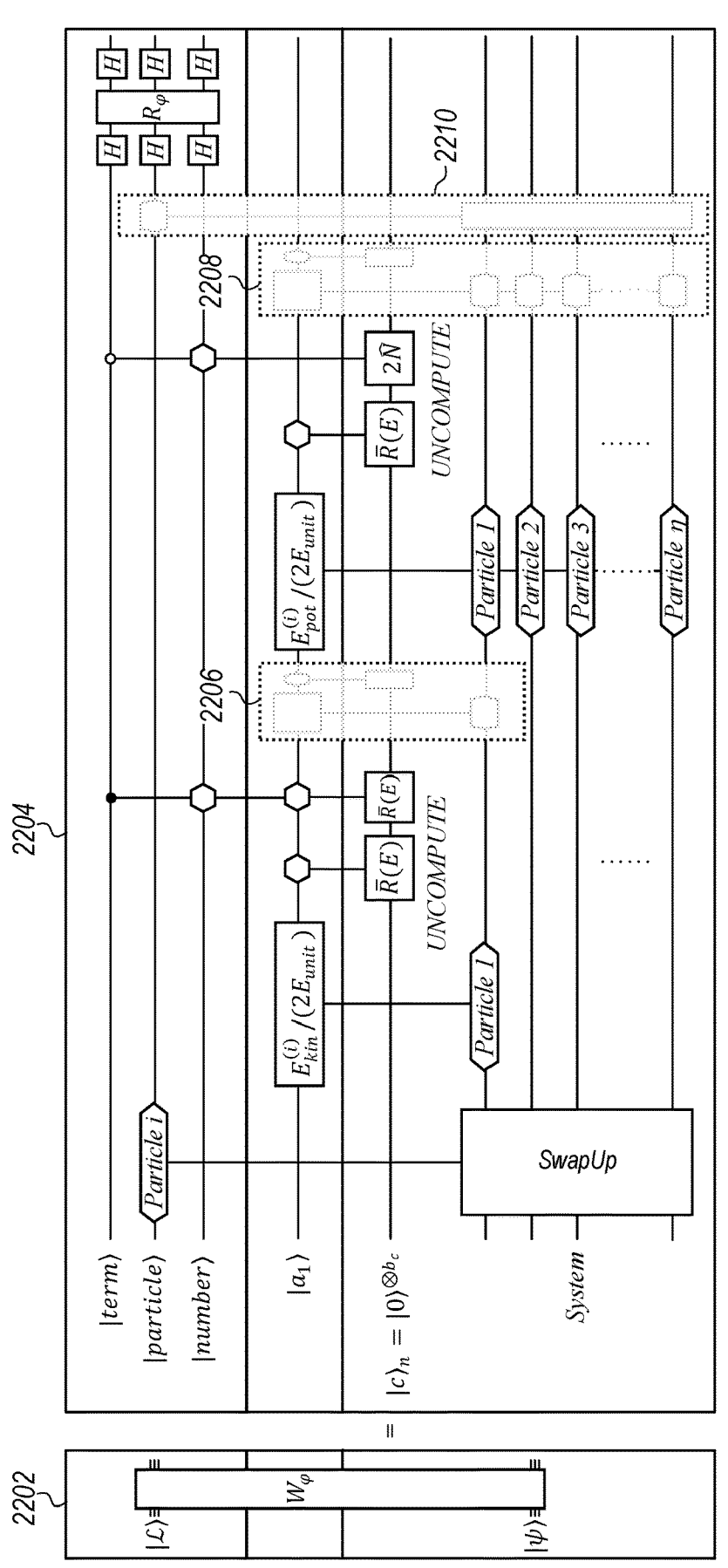
FIG. 8 is another schematic diagram illustrating a circuit for implementing a qubitization operator to emulate time evolution with more compact notation, according to some embodiments.

To summarize, implementing time evolution or phase estimation via qubitization, involves implementing the qubitization operator $W_\varphi$ or W, and then repeating it $\mathcal{O}(\lambda)$ times for the full computation.
FIGS. 7-8—Circuit for a Qubitization Operator FIG. 7 is a schematic diagram illustrating a circuit for implementing a qubitization operator to emulate time evolution, according to some embodiments. FIG. 7 illustrates the full circuit to perform one qubitization step (i.e., select-unprepare-reflect-prepare) for an $\eta$-electron system described by the Hamiltonian $\tilde{H}$. FIG. 8 is another schematic diagram of the qubitization operator in a slightly more compact notation.

In FIGS. 7-8, all operations except for the final Hadamards and $R_\varphi$ are part of the SELECT operation. Because $|\mathcal{L}\rangle = + ^{\otimes n_\mathcal{L}}$, the PREPARE and PREPARE$^\dagger$ operations each consist of a sequence of Hadamards. Said another way, PREPARE and PREPARE$^\dagger$ are both performed through application of a Hadamard gate to each qubit because the state $|\mathcal{L}\rangle$ that is prepared is a simple equal superposition of all computational basis states. (Note that, if the number of particles is not a power of two, resources may be preserved by performing a UNIFORM operation instead of a layer of Hadamards.)

Figure 9:
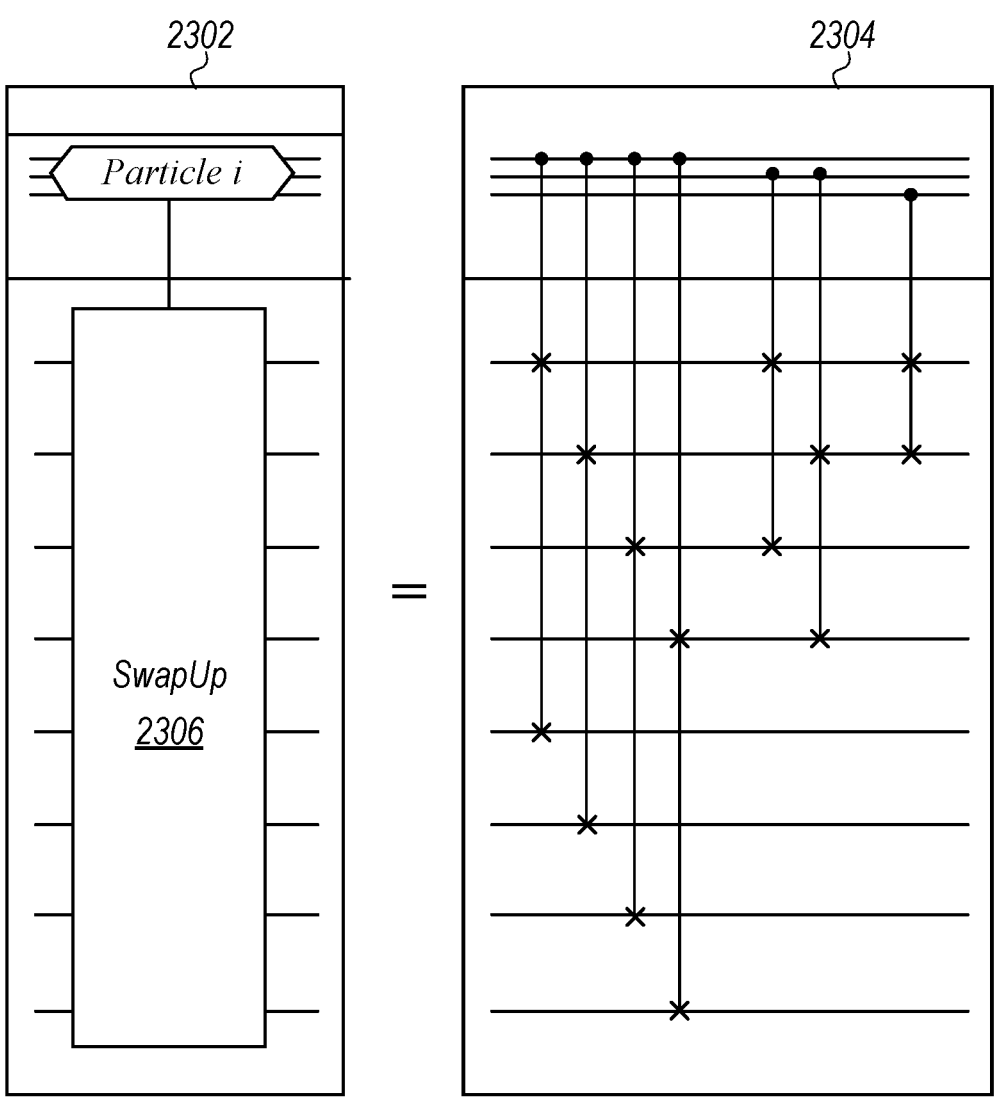
FIG. 9 is a quantum circuit diagram illustrating a SwapUp operation, according to some embodiments.

The first operation of the SELECT is a SwapUp operation. SwapUp is an operation that uses $\eta - 1$ controlled swaps to swap the i-th particle (controlled on the $|particle\rangle$ register being in the state $|i\rangle$) into the register of particle 1, and an example circuit to implement SwapUp is illustrated in FIG. 9.

Figure 10:
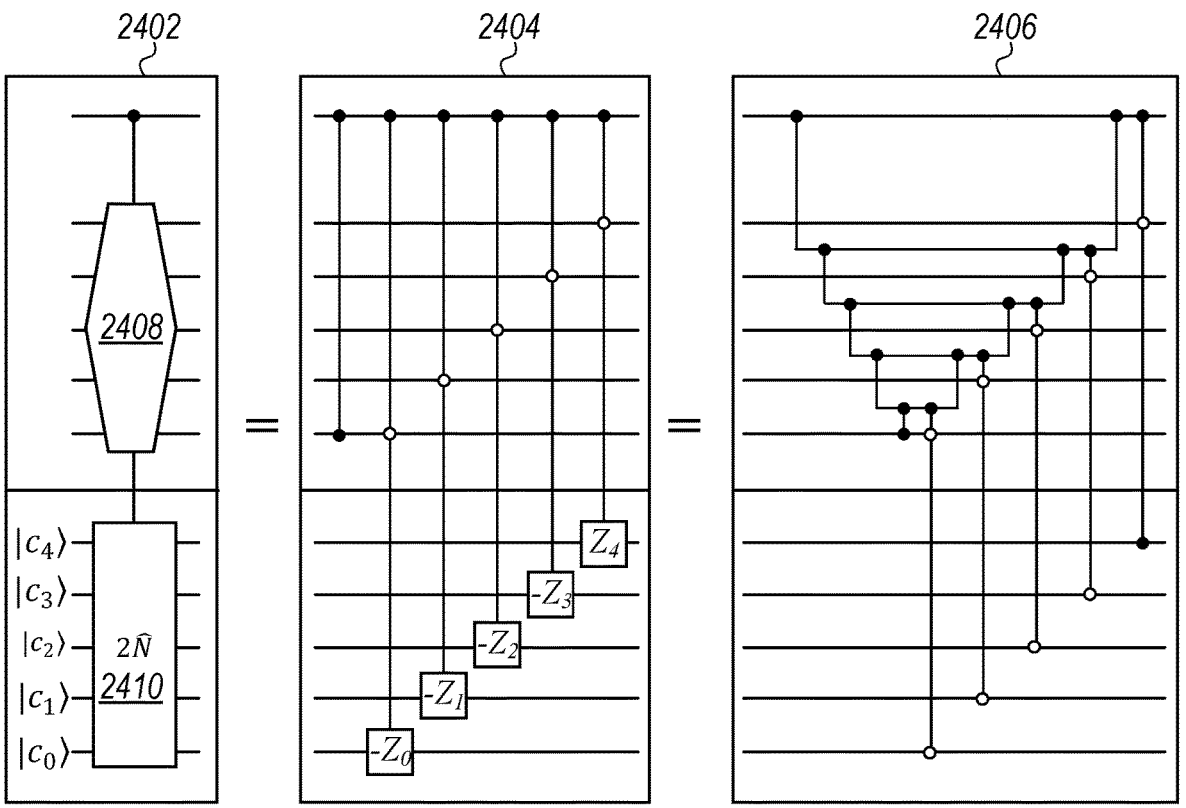
FIG. 10 is a quantum circuit diagram illustrating a controlled SELECT operation, according to some embodiments.

Next, controlled on the momenta of particle 1, the kinetic energy $$E_{kin}^{(i)}/(2E_{unit})$$

may be computed and written into the $|a_1\rangle$ register. A cutoff may then be applied to this number by applying the function $$\overline{R}(E) = \begin{cases} 2^{b_e-1} - 1 & \text{if } E \geq 2^{b_e-1} \\ -2^{b_e-1} & \text{if } E < -2^{b_e-1} \\ \text{floor}(E) & \text{else} \end{cases} \qquad (33)$$

before the resulting number is written into the $|c\rangle_n$ register. Controlled on the $|term\rangle$ register being in the $|1\rangle$ state, a SELECT operation controlled on the $b_e$-qubit$|number\rangle$ register may be applied using the linear combination of $2^{b_e}$ unitaries that is $2\hat{N}$. This is an operation that consists of $b_e - 1$ Toffoli gates. FIG. 10 illustrates an example for $b_e = 5$.
This operation indeed corresponds to a controlled $$\text{SELECT}_{2\hat{N}} = \sum_{i=1}^{2^{b_e}} |i\rangle\langle i|_{|number\rangle} \otimes (2\hat{N})_i \Big|_{|c\rangle_n},$$

where $(2\hat{N})_i$ is the i-th term of $2\hat{N}$ when written as a linear combination of $2^{b_e}$ Pauli operators. As a reminder:

$$2\hat{N} = -1 - Z_0 - Z_1 - Z_1 - Z_2 - Z_2 - Z_2 - Z_2 - \ldots Z_{b_e-2} + Z_{b_e-1} + \\ Z_{b_e-1} + \ldots + Z_{b_e-1}. \qquad (34)$$

In the example above, it is a sum of 16 $Z_4$ operators, 8–$Z_3$'s, 4–$Z_2$'s, 2–$Z_1$'s, one $-Z_0$ and one constant '1'. The circuit shown in FIG. 10 applies a $Z_4$ to $|c\rangle_4$ for 16 out of 32 possible computational eigenstates in the $|number\rangle$ register, namely all those 5-qubit states starting with "0". A $-Z_3$ is applied for 8 out of 32 states, namely for those starting with "10". $-Z_0$ is only applied for 1 out of 32 states, namely only for $|11110\rangle$ After this operation is applied in the circuit of the qubitization operator, the kinetic-energy computation is un-computed with an inverse kinetic energy operator and the same process is repeated for the potential energy. This time, the $2\hat{N}$-SELECT operation is performed conditioned on the $|term\rangle$ qubit being in the $|0\rangle$ state. After uncomputing the potential energy and the SwapUp, the SELECT part of the qubitization operator is complete.

Figure 11:
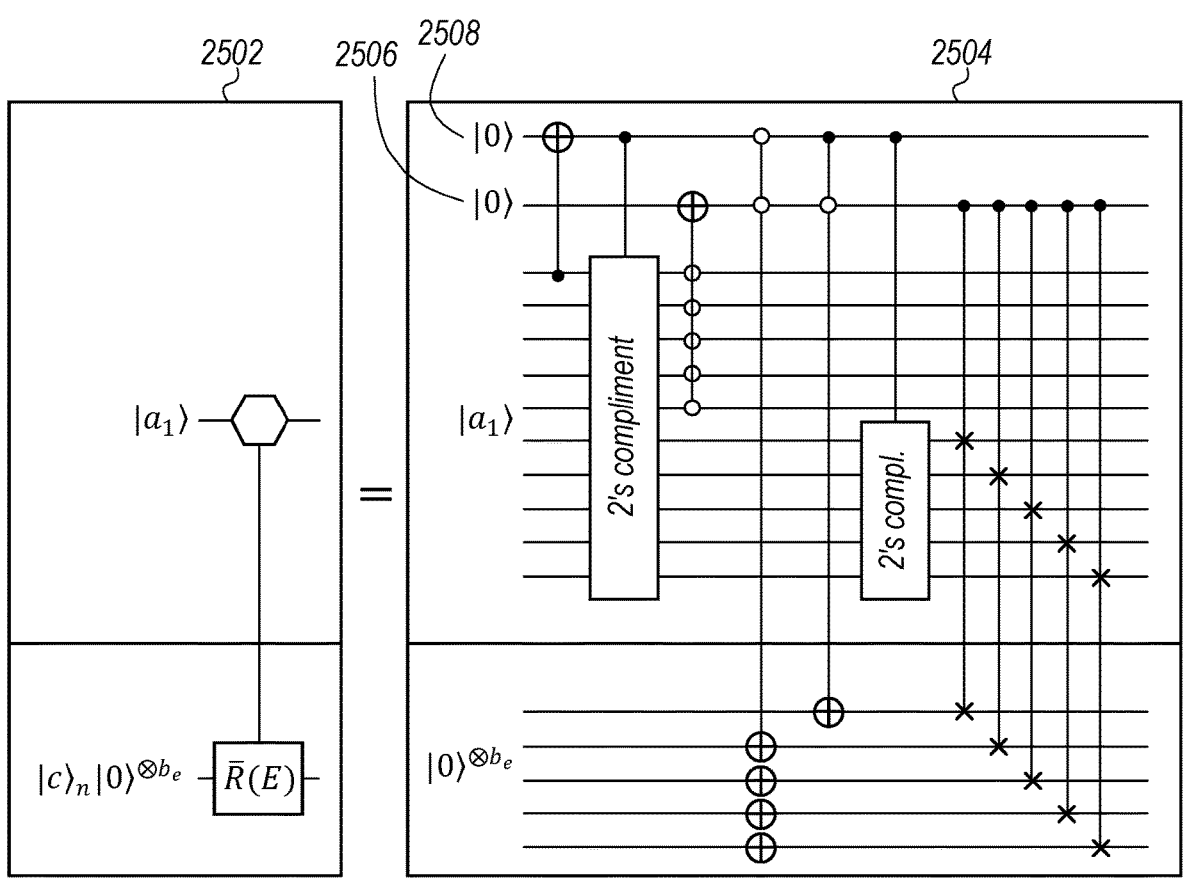
FIG. 11 is a quantum circuit diagram illustrating an energy cutoff function, according to some embodiments.

The operation that applies the cutoff function $\overline{R}(E)$ to the signed integer stored in $|a_1\rangle$ is also a simple one. An example circuit for performing this cutoff for $b_e = 5$ is shown in FIG. 11. The cutoff function is represented schematically in FIG. 11, as well as in other Figures, as a hexagon.

Figure 12:
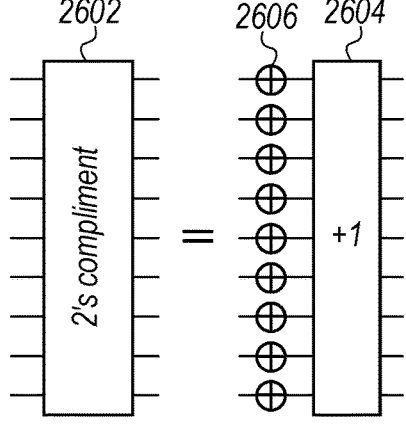
FIG. 12 is a quantum circuit diagram illustrating implementation of a 2's complement operation, according to some embodiments.

The circuit shown in FIG. 11 uses two ancilla qubits 2506, 2508 initialized in $|0\rangle$ that are referred to herein as "bool qubits". The first bool qubit 2508 indicates whether $a_1$ is a negative number, i.e., it flips to |1⟩ if $a_1$ is negative. The second 2506 indicates that a cutoff is not required, i.e., it flips to |1⟩ if $-2^{b_e-1} \le a_1 < 2^{b_e-1}$. Since our signed integers are stored in two's complement representation, the first bit of the number indicates whether the number is positive or negative. The first bool qubit is flipped controlled on the first qubit of |$a_1$⟩ Changing the sign of an integer corresponds to a "2's complement" operation, which means flipping all bits and incrementing the resulting number, as shown in FIG. 12.

Incrementing an n-qubit number can be done with n Toffolis. |$a_1$⟩ is flipped if it is negative, effectively computing the absolute value. In this example, a cutoff may be applied, if the absolute value of $a_1$ is larger than $0000011111_2$. The multi-controlled-not gate therefore flips the second bool to |1⟩ (indicating that no cutoff is utilized), if the first $b_e$ bits are all 0. If both bools are 0), then the number is positive and a cutoff is utilized, so $01111_2$, the largest positive number, is written into the |c⟩$_h$ register. If the first bool is 1 and the second bool is 0, then the number is negative and a cutoff is utilized, so $10000_2$, the most negative 5-bit two's-complement number, is written into the the |c⟩$_h$ register. Next, if $a_1$ was previously flipped to $-a_1$, it is flipped back. The corresponding "2's complement" operation can, in principle, be applied to all qubits of |$a_1$⟩ but only the last $b_e$ qubits are relevant for $\overline{R}(E)$. If the second bool is 1 indicating that no cutoff is utilized, the last 5 qubits of |$a_1$⟩ are swapped into the target register, effectively implementing the function $\overline{R}(E)$.

A remaining step when implementing this qubitization operator is the computation of the kinetic and potential energy. In the following, we will describe these operators in more detail.

Figure 13:
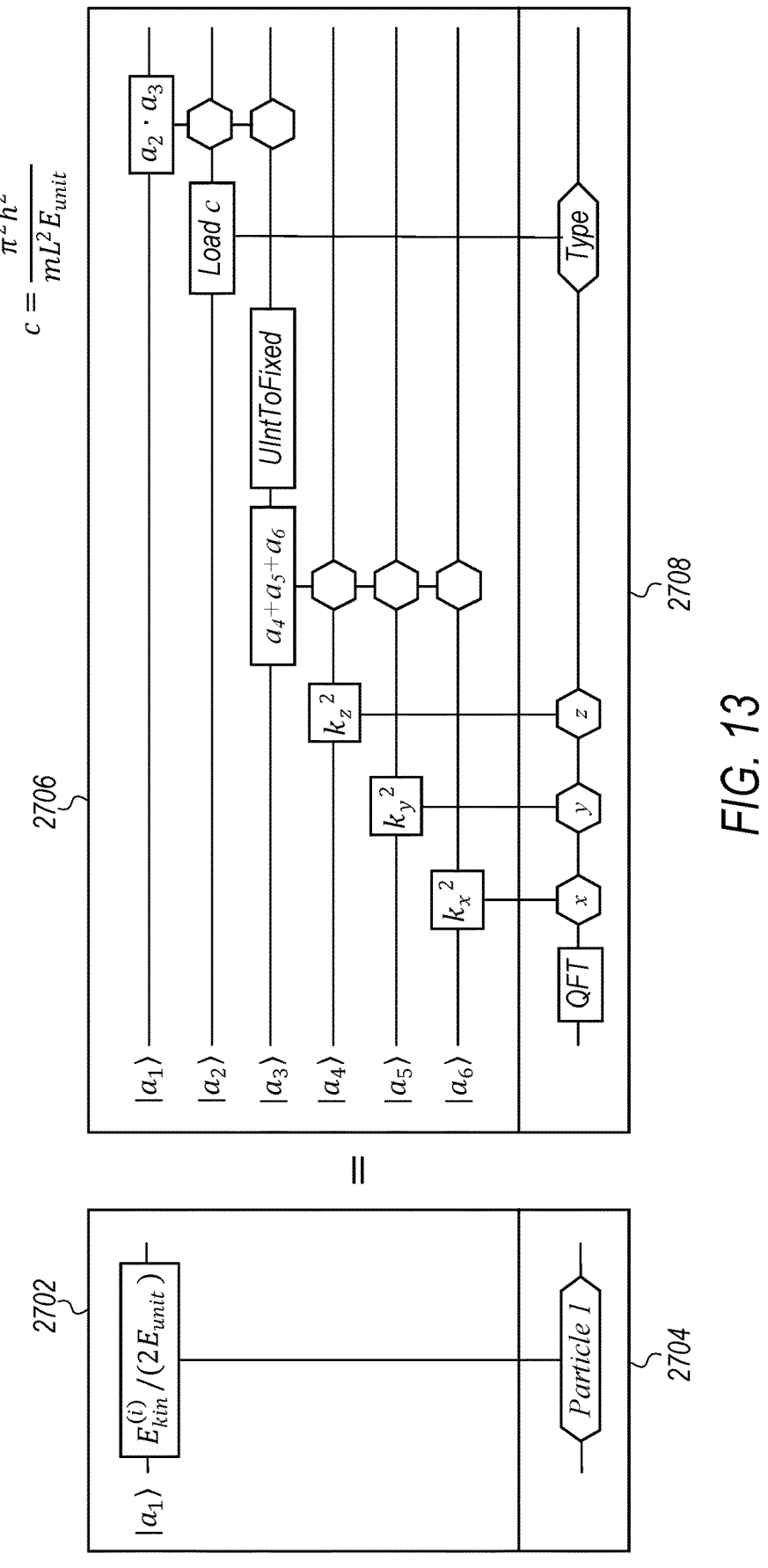
FIG. 13 is a quantum circuit diagram illustrating a kinetic energy operator, according to some embodiments.

FIG. 13—Circuit for the Kinetic Energy

FIG. 13 is a schematic diagram illustrating a circuit that may be used to compute the kinetic energy of particle i after it has been swapped into the register of particle 1, according to some embodiments.

The circuit uses five additional variables |$a_2$⟩ –|$a_6$⟩ First, three QFTs are performed on the $b_i$-qubit |x⟩ |y⟩ and |z⟩ registers of particle 1. These registers initially store the x, y and z positions in units of $l_{unit}$. After the QFTs, the registers store the momenta $k_x$, $k_y$ and $k_z$ in units of $2\pi\hbar/L$. These numbers are stored as signed $b_i$-bit integers. They are squared and written into registers |$a_4$⟩ |$a_6$⟩ converting them into $2b_i-1$-bit unsigned integers, such that registers |$a_4$⟩ |$a_6$⟩ each contain $2b_i-1$ qubits. Squaring a $b_i$-qubit number may be performed using $$3b_i^2 + b_i$$

Figure 14:
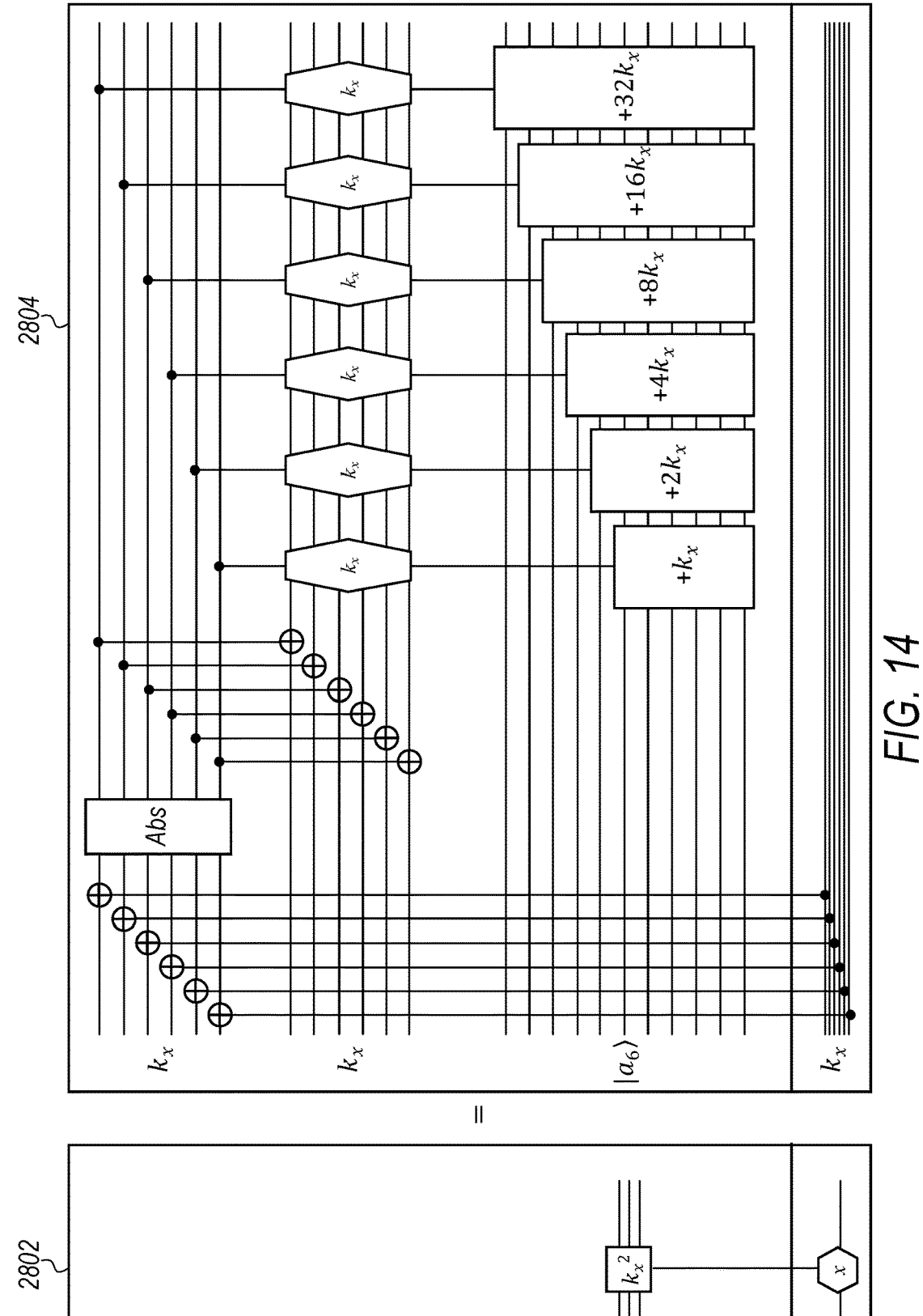
FIG. 14 illustrates a quantum circuit configured to square a number, according to some embodiments.

Toffoli gates using a multiplicative computation such as the one shown in FIG. 14. FIG. 14 illustrates $b_i$ controlled adders with an average size of $1.5b_i$. Since controlled n-qubit Gidney adders may be implemented with 2n Toffolis, these adders may be implemented with $$3b_i^2$$

Figures 15, 16:
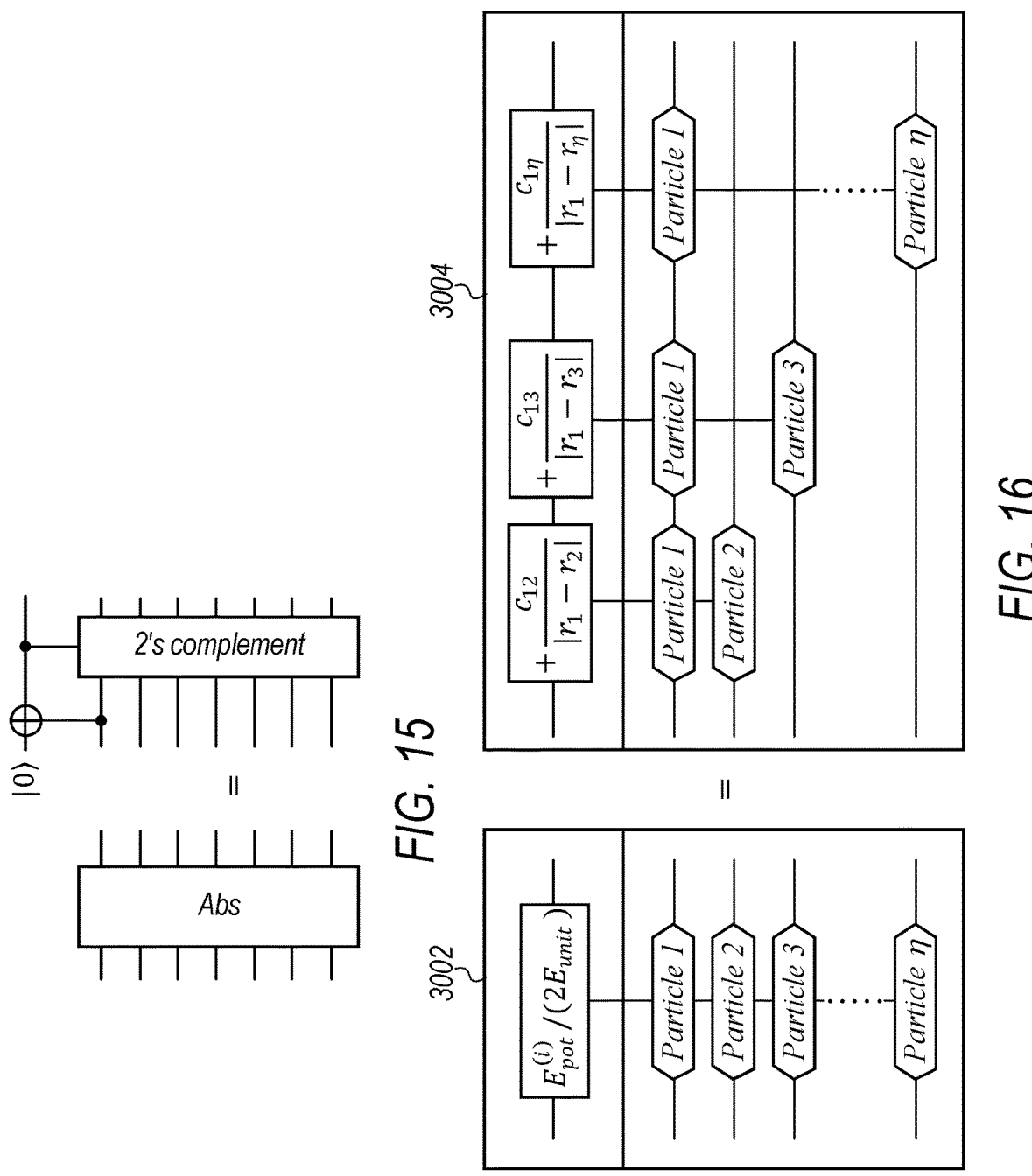
FIG. 15 illustrates a quantum circuit configured to compute the absolute value of a number, according to some embodiments.
FIG. 16 illustrates a quantum circuit configured to compute the total system potential energy, according to some embodiments.

Toffolis. Since momenta may be negative, the "Abs" operation first computes the absolute value of the number in case it is negative. As mentioned previously, it is performed using a controlled "2's complement", which is illustrated in FIG. 15.

After squaring, the three resulting numbers may be added into a $2b_i$-qubit register |$a_3$⟩ The unsigned integer is converted into a fixed-point number. This is not an operation that utilizes gates, but merely changes how we interpret the number. Controlled on the type of the particle (electron, Li nucleus, P nucleus, etc.), a fixed-point number c is loaded into register |$a_2$⟩ where $$c = \frac{\pi^2\hbar^2}{mL^2E_{unit}}. \tag{35}$$

This is a number that converts squared momenta in units of $(2\pi\hbar/L)^2$ into kinetic energies in units of $2E_{unit}$. The number depends on the mass of the particle, so it will be different depending on the particle type. Loading this number conditioned on the |type⟩ register is a computationally cheap QROM read, which takes $n_{types}$ Toffolis (e.g., 4 Toffolis for the four types in a $LiPF_6$ molecule). Finally, these two numbers are multiplied and the result written into |$a_1$⟩ The addition and multiplication of fixed-point numbers is the same as for integers. After multiplication, the radix point shifts by a known number of qubits, which is an operation that can $b_e$ handled classically without utilizing any gates.

In total, the kinetic energy part roughly utilizes three QFTs, three $b_i$-qubit multiplications, a multiplication that depends on the size of c, and a few additional (but insignificant) operations. Typically, the squared momenta will be large numbers, whereas c will be a small number. A very conservative estimate would be to treat $a_2$ and $a_3$ both as $2b_i$-bit fixed-point numbers with the radix point in the middle, such that the final multiplication takes $$12b_i^2$$

Toffoli gates. Each $b_i$-qubit QFT may be performed with $$3b_i^2$$

Toffoli gates, if a |QFT⟩ state is prepared at the beginning of the computation.

The total cost is therefore roughly $$30b_i^2$$

Toffolis (where $$b_i = \log N^{\frac{1}{3}}\Big).$$

If we also take into account the uncomputation, the cost increases to $$60b_i^2$$

Toffolis. Note that the final operation may be an arbitrary multiplication, or alternatively in other embodiments it may be implemented as a controlled multiplication by a constant.

Figure 17:
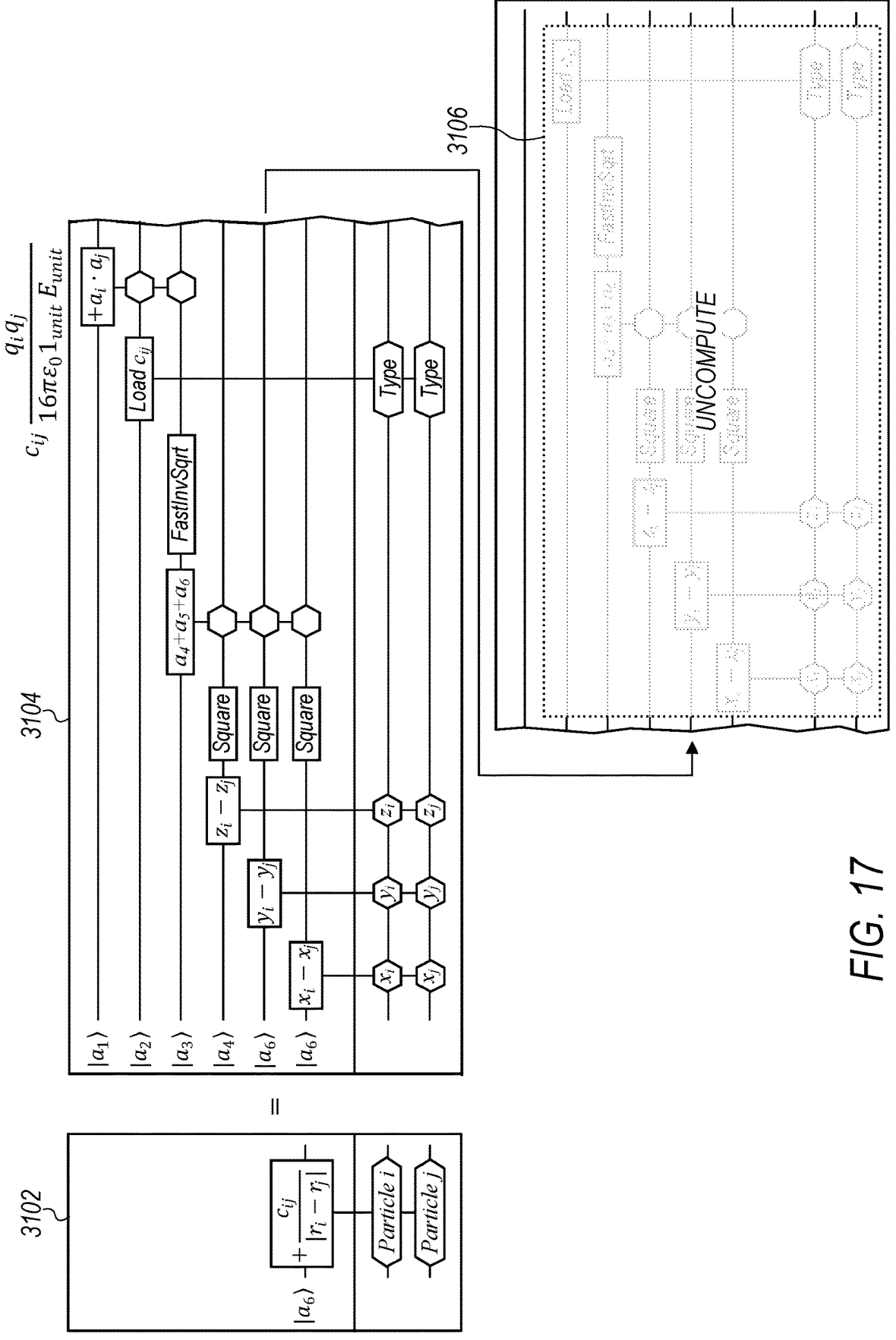
FIG. 17 illustrates a quantum circuit configured to compute a single term of the potential energy, illustrating according to some embodiments.

FIGS. 16-17—Circuits for Potential Energy

FIG. 16 is a schematic diagram that illustrates an example circuit for computing the potential energy of the physical system, according to some embodiments. It is done in $\eta-1$ steps, where in each step a contribution due to one two-particle interaction is added. Each of these steps involves multiple subroutines, as illustrated in FIG. 17.

Figure 18:
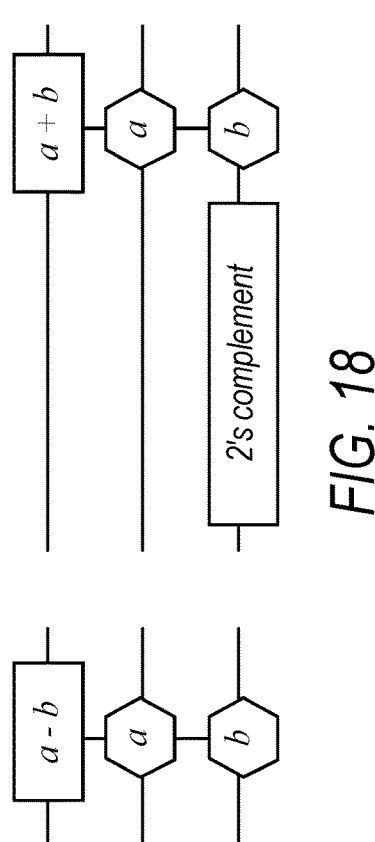
FIG. 18 is a quantum circuit diagram illustrating the equivalence between computing a difference of two numbers and computing a sum of the first number and the 2's complement of the second number, according to some embodiments.

First, the differences between the x, y and z positions of particles i and j are loaded into registers $|a_4\rangle$, $|a_6\rangle$. Note that computing a difference is the same as computing the sum of the first number and the two's complement of the second number, as shown in FIG. 18.

Also note that the addition may produce an additional carry bit. However, since we want to enforce periodic boundary conditions (such that, e.g., $-L$ and $L-1$ have a difference of 1), we may only use the by least significant bits as the result of the subtraction.

Note that this implements "false" periodic boundary conditions. With true periodic boundaries, each particle at position r has copies of itself at positions $\vec{r}+L\cdot(i\cdot\vec{e}_x+j\cdot\vec{e}_y+k\cdot\vec{e}z)$, where L is the side length of the unit cell, i, j and k are integers, and $\vec{e}_{x/y/z}$ are unit vectors in the x/y/z direction. The method described here only considers Coulomb interactions with the closest copy of the particle, but not the infinitely many copies in other unit cells. This method is suitable for the simulation of systems where true periodic boundaries are not desired (such as collections of single molecules), or periodic systems with large neutrally charged unit cells where all particles are clustered in a small section of the unit cell. For the simulation of true periodic systems (such as crystals), it may be desirable for copies of particles in distant unit cells to be taken into account in the sum.

Next, the differences are squared, turning the $2b_i-1$-qubit registers $|a_4\rangle$, $|a_6\rangle$ into unsigned integers. These numbers are added into the $2b_i$-qubit register $|a_3\rangle$. A "FastInvSqrt" operation is applied to the register, which turns $|a_3\rangle$ into a fixed-point number storing the reciprocal square root of the previously computed sum, i.e., $$\frac{1}{\sqrt{(x_i-x_j)^2+(y_i-y_j)^2+(z_i-z_j)^2}} = \frac{1}{|r_i-r_j|}. \qquad (36)$$

Controlled on the types of the two particles (where there are $$n_{types}^2$$

possible combinations), the number $$c_{ij} = \frac{q_i q_j}{16\pi\varepsilon_0 l_{unit} E_{unit}} \qquad (37)$$

is loaded into register $|a_2\rangle$. This number converts inverse lengths in units of $1/l_{unit}$ into potential energies in units of $2E_{unit}$. The numbers $a_2$ and $a_3$ are multiplied and written into the register $|a_1\rangle$.

The circuit consists of operations that we have already seen in the kinetic-energy circuit, with the addition of the fast inverse square root operation. The Fast inverse square root operation is explained in detail below.

Fast Inverse Square Root

There are various methods to compute reciprocal square roots on a classical computer. One particularly cost-efficient method is the so-called "fast inverse square root". In some embodiments, the classical fast inverse square root computation is converted into a quantum circuit.

The fast inverse square root computes the reciprocal square root $1/\sqrt{x}$ of a 32-bit single-precision floating-point number x using the following steps:

1. Interpret the 32-bit float as a 32-bit signed integer.
2. Shift all bits of this integer by one bit to the right.
3. Subtract this integer from the 32-bit integer 0x5F3759DF (the "magic number").
4. Interpret this 32-bit number as a float. You now have an approximation of the reciprocal square root that has a maximum relative error of around 3%.
5. If more precision is desired, the error may be reduced by applying Newton's methods to compute $y_{n+1}=y_n\cdot(3-xy_n^2)/2$ with $y_0$ as the result from step 4. After one iteration, $y_1$ has a maximum relative error of around $2\times10^{-3}$. After two iterations, $y_2$ has a maximum relative error of around $5\times10^{-6}$.

Other "magic numbers" (other than 0x5F3759DF) may be used to tweak the constants in Newton's methods to reduce the relative error, but the original FastInvSqrt method is already reasonably efficient.

Figure 19:
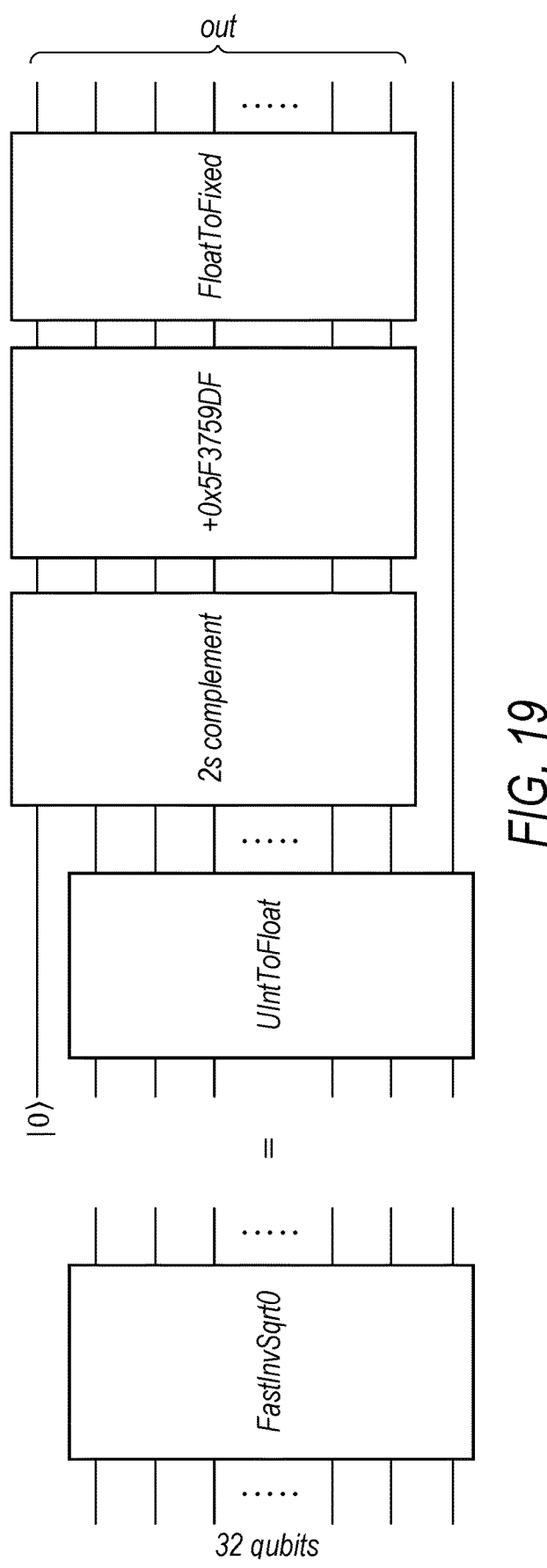
FIG. 19 is a quantum circuit diagram illustrating a first iteration of a fast inverse square root computation, according to some embodiments.
Figure 20:
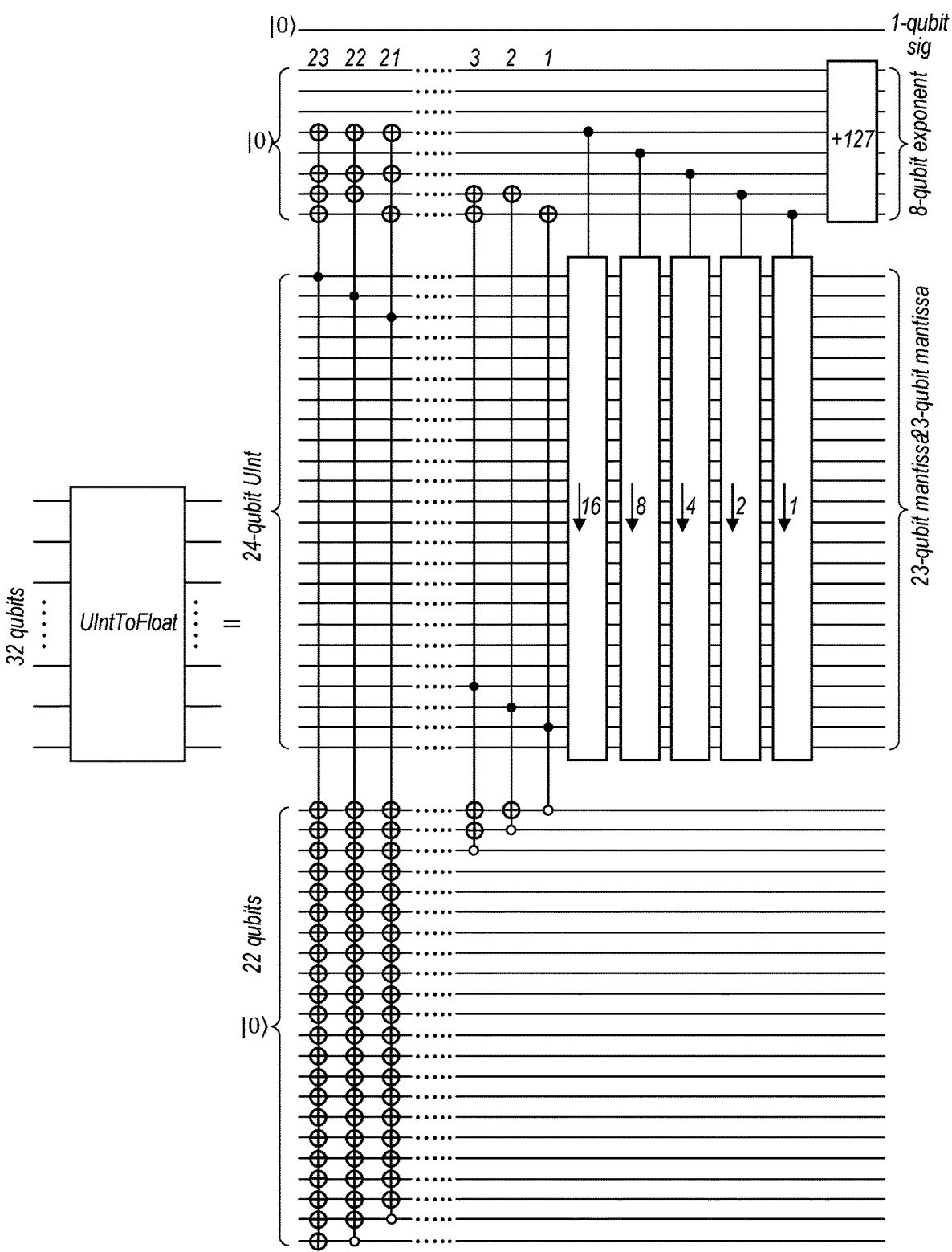
FIG. 20 illustrates a quantum circuit configured to convert an integer to a single-precision float, according to some embodiments.

FIG. 19 is a quantum circuit diagram illustrating implementation the zeroth-order approximation (steps 1-4) of this computation as a quantum circuit. Since an unsigned integer is used as input in this application, this integer is first converted into a 32-qubit single-precision float. Subsequently, the method shifts all bits (no quantum gate required), performs the 2 s complement operation, adds the magic number, and converts the float to a fixed-point number. Converting an unsigned integer to a float may be performed with this circuit. FIG. 20 illustrates an example of a 24-qubit integer that is converted using 128 Toffoli gates.

Figure 21:
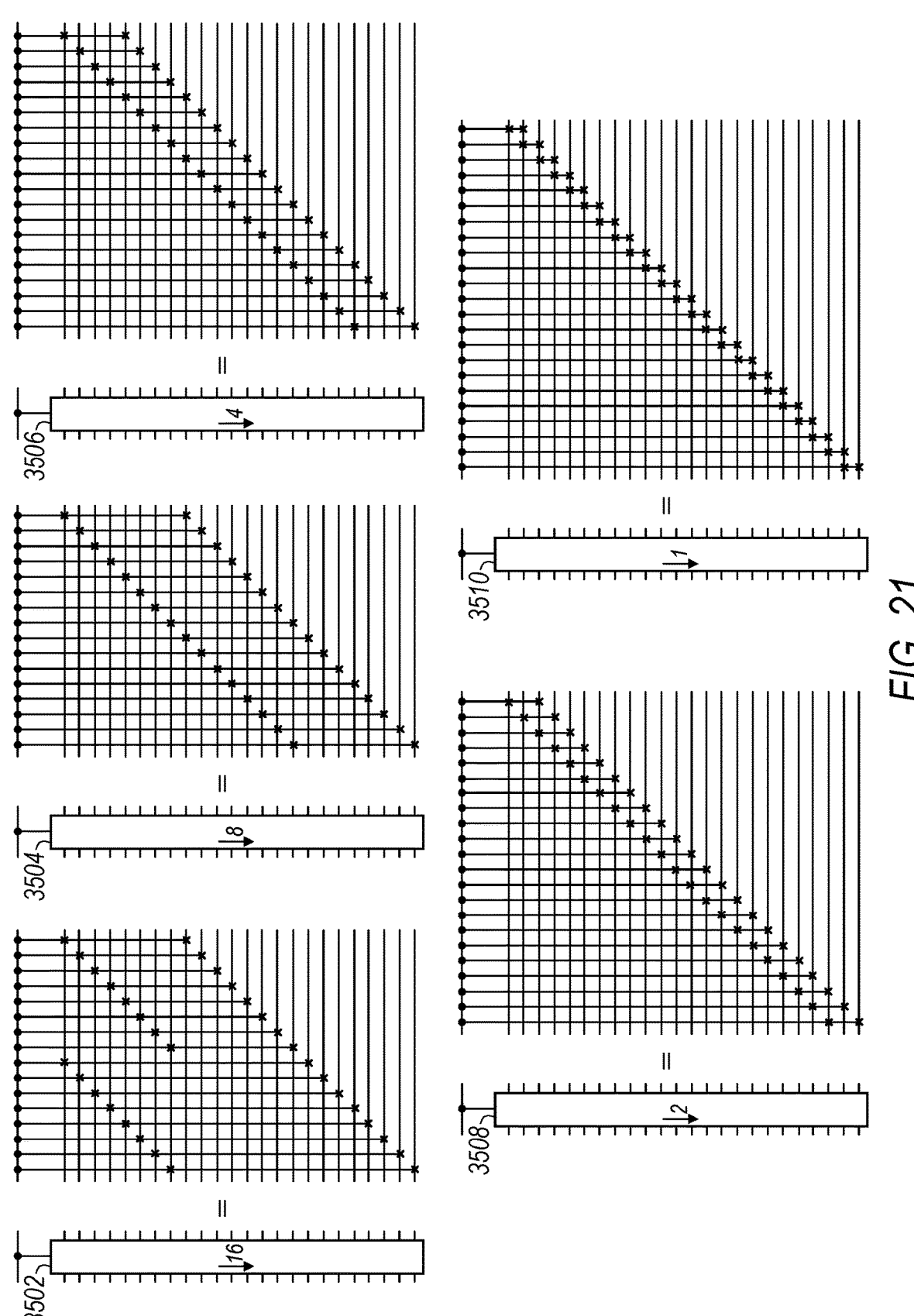
FIG. 21 is a quantum circuit diagram illustrating the cyclic permutation operators shown in FIG. 20, according to some embodiments.

A single-precision float consists of one bit s that is the sign, 8 bits that encode the exponent e as an unsigned integer with a constant offset of $-127$ (i.e., the bit string 00000000 represents $-127$ and 11111111 represents 128) and 23 bits as the mantissa m, i.e., the digits after the radix point of a number between 1 and 2. The number represented by the single-precision float is then $s\cdot2^e\cdot1\cdot m_1 m_2 \ldots m_{23}$. The 1 before the radix point is not encoded, and is therefore also referred to as the "hidden bit". In the circuit above, the first 23 Toffolis are used to write the exponent as an ordinary unsigned integer into the 8-qubit exponent register. The 22 ancilla qubits below are used to prevent the Toffolis from triggering after the most significant nonzero digit has been found. In the next step, 5 controlled cyclic permutations are performed to swap the bits that come after the most significant nonzero bit to the first 23 qubits, whereas the most significant nonzero qubit is shifted to the last position. These cyclic permutation operators consist of many controlled swaps, as shown in FIG. 21.

After the cyclic permutations are complete, the first 23 qubits of the original UInt register will contain the mantissa. A constant offset of 127 is added to the exponent. The sign is trivially 0, since we are converting a positive integer. Note that this circuit treats a zero as a one, since $1/\sqrt{0}$ would be not defined.

Figure 22:
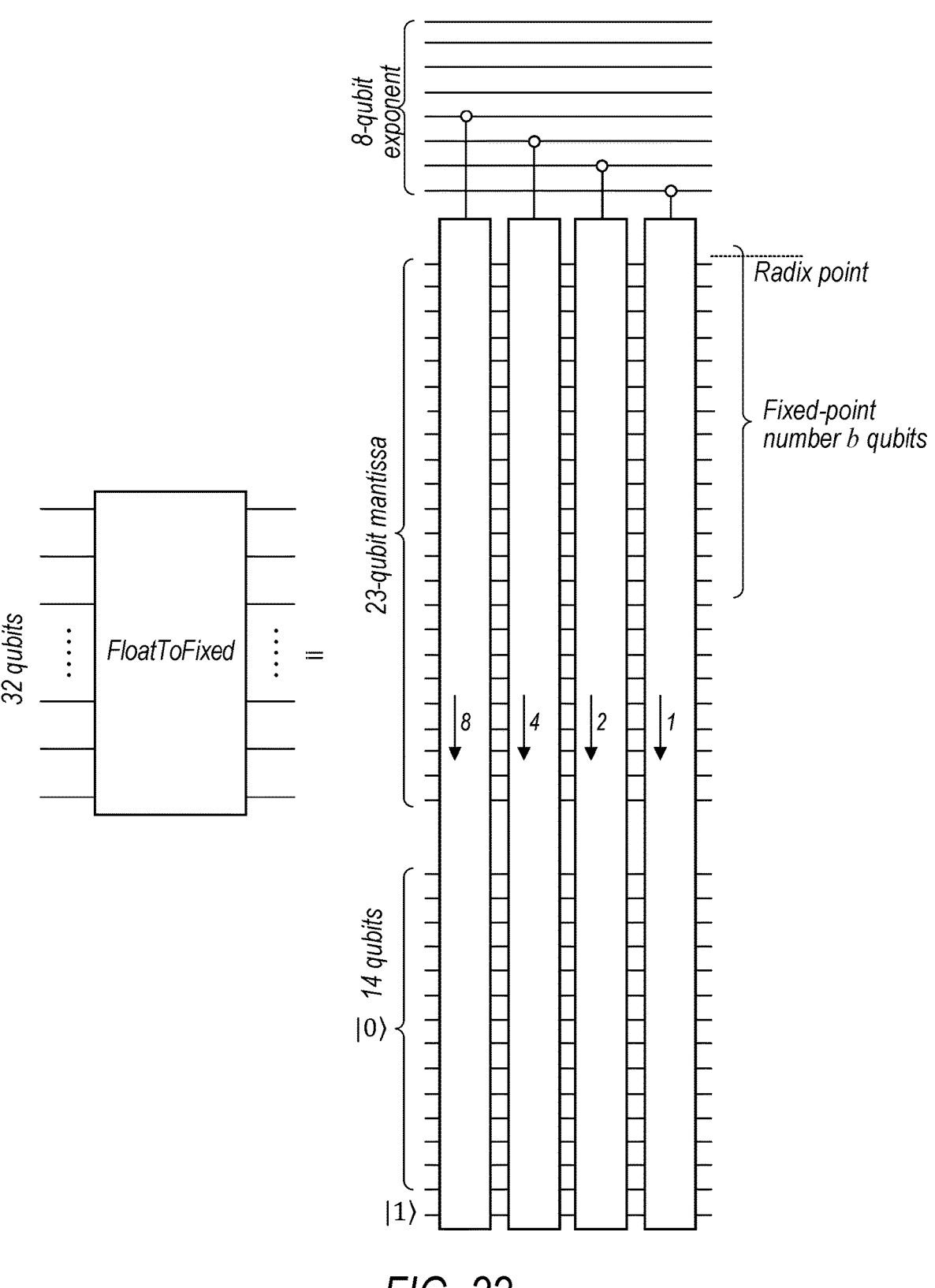
FIG. 22 illustrates a quantum circuit configured to convert a float to a fixed-point number, according to some embodiments.

After the "2 s complement" and "+0x5F3759DF" operations in FIG. 19 (which are standard integer operations), the float will encode a positive number between $2^{-12}$ and 1. The conversion of such a number from a float to a b-qubit fixed-point number may be performed with 137 Toffolis using the circuit shown in FIG. 22.

This circuit works for numbers that are between $2^{-15}$ and 1. In the offset representation of the exponent, −1 is 0111 1110, −2 is 0111 0101, −3 is 0111 0100, and so on. If all bits are flipped and the first bit is ignored, the resulting number may be interpreted as the negative exponent. Controlled on the flipped bits, cyclically permuting the mantissa converts it into a fixed-point number. By initializing a 15-qubit register in |00 . . . 001⟩ these cyclic permutations shift the hidden bit and leading zeros into the fixed-point number. A subset of b qubits is kept as the new fixed-point number with the radix point right before the first bit. Because the largest number that may be used as an input to the inverse square root is $(3 \cdot 2^{b_i-1})^2$, it is sufficient to keep $b_i$ bits.

Figures 23, 24:
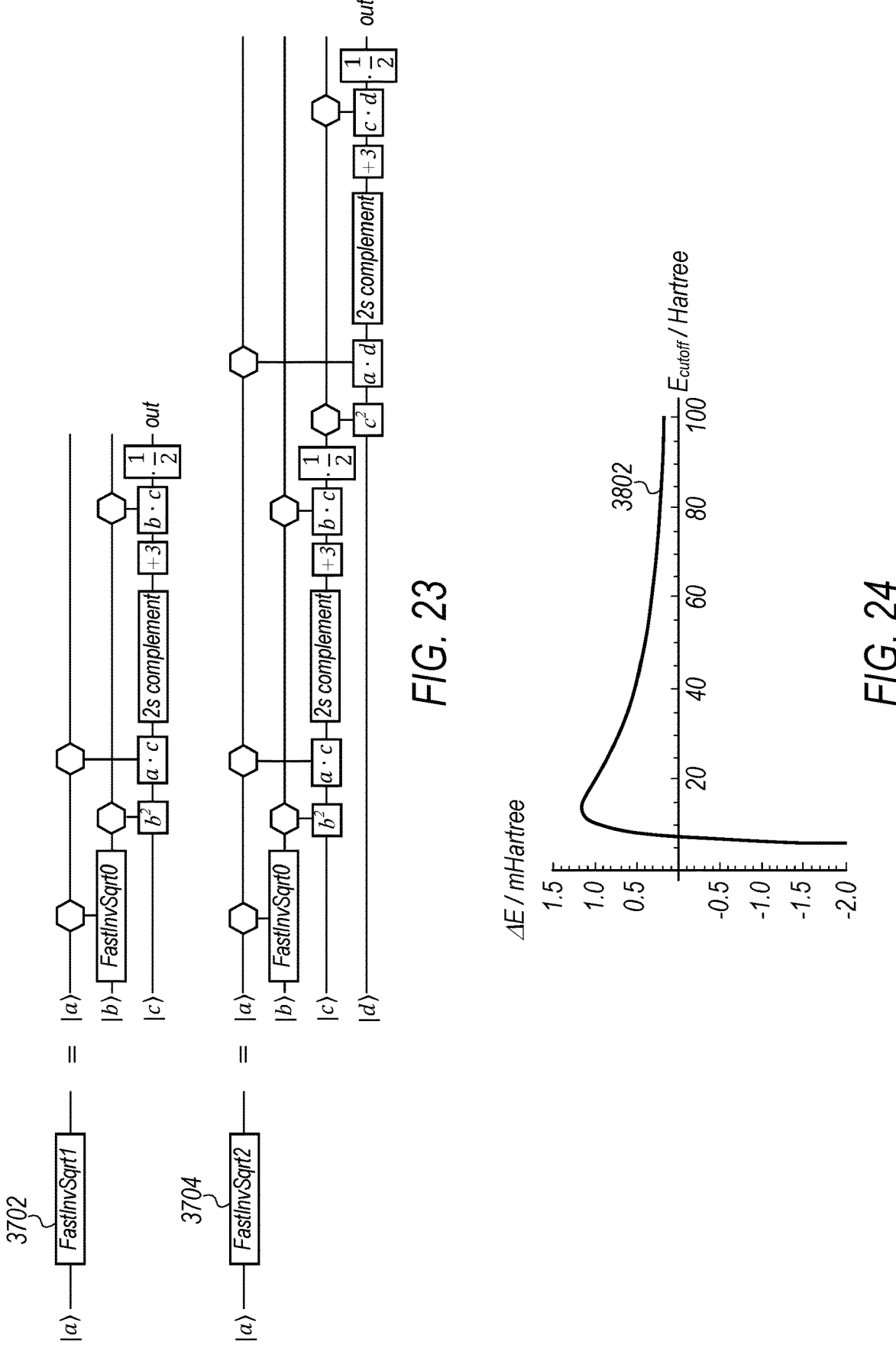
FIG. 23 is a quantum circuit diagram illustrating second and third iterations of the fast inverse square computation, according to some embodiments.
FIG. 24 is a plot of energy uncertainty as a function of the energy cutoff, according to some embodiments.

If more precision is desired for the reciprocal square root, one or multiple iterations of Newton's method may be utilized according to the circuits shown in FIG. 23. FastInvSqrt1 (3702) illustrates a single additional iteration and FastInvSqrt2 (3704) illustrates two additional iterations. Additional iterations involve three multiplications, a 2 s complement, an addition and a multiplication by 0.5 (which utilizes no operations, since it just shifts the radix point) for each iteration. The $b^2$ multiplication is a $b_f$-qubit multiplication, since it involves two small numbers between $2^{-b_i}$ and 1. The a·c multiplication naively is a $4b_f$-qubit multiplication, since it involves a small number between $2^{-2b_i}$ and 1 and a large number between 1 and $2^{2b_i}$. But by shifting the radix point of one of these numbers by $2b_i$ places, a $2b_f$-qubit multiplication may be performed instead (and then shift the radix point appropriately). The resulting number will be close to 1, such that the final b·c multiplication can again be a $b_f$-qubit multiplication.

Computational Cost Estimate for Fast Inverse Square Root

For each addition of a two-particle Coulomb term, the FastInvSqrt circuit uses three $b_f$-qubit multiplications, around 250 Toffolis for conversion to floats and back, and two $b_f$- and one $2b_f$-qubit multiplication per Newton's-method iteration. These are computed and un-computed twice, resulting in an additional factor of four. There is also the final multiplication with a constant that is only uncomputed once, which we will again assume to b_e a $2b_i$-qubit multiplication. This is a total of $$132b_i^2$$

Toffolis for the multiplications, which is the dominant computational cost.

The multiplications in the potential-energy computation are overall a dominant cost of the entire computation, since they are repeated η−1 times for each qubitization step. The only other subroutine that scales with η is the initial SwapUp, but this only contributes $3b_i+\log(n_{types})$ Toffolis per particle. With $n_{rep} \in \mathcal{O}(\eta \cdot E_{cutoff}/\epsilon_{add})$ repetitions for a phase estimation computation with an additive error $\epsilon_{add}$, we have an overall Toffoli count of around $$n_{rep} \cdot \eta \cdot 132b_i^2.$$

FIG. 24 is a plot showing the error ΔE in the ground-state energy of the hydrogen atom as a function of a high-energy cutoff $E_{cutoff}$ as used in this note, i.e.:

$$\Delta E = -0.5 Hartree - \left(E_{kin}^{(cutoff)} + E_{pot}^{(cutoff)}\right) \tag{38}$$

$$E_{kin}^{(cutoff)} = \tag{39}$$

$$4\pi \left( \int_0^{\sqrt{2E_c}} dpp^2 \left( \frac{2\sqrt{2}}{\pi(1+p^2)^2} \right)^2 \cdot \frac{p^2}{2} + \int_{\sqrt{2E_c}}^{\infty} dpp^2 \left( \frac{2\sqrt{2}}{\pi(1+p^2)^2} \right)^2 \cdot E_c \right) \cdot 1$$

$$Hartree$$

$$E_{pot}^{(cutoff)} = \tag{40}$$

$$-4\pi \left( \int_0^{1/E_c} drr^2 \left( \sqrt{\frac{1}{\pi}} e^{-r} \right)^2 \cdot E_c + \int_{1/E_c}^{\infty} drr^2 \left( \sqrt{\frac{1}{\pi}} e^{-r} \right)^2 \cdot \frac{1}{r} \right) \cdot 1 Hartree$$

A computation for the hydrogen atom suggests that a cutoff around 10-100 Hartree would provide a chemical accuracy of around 1 mHartree.

Circuit Depth

Figure 25:
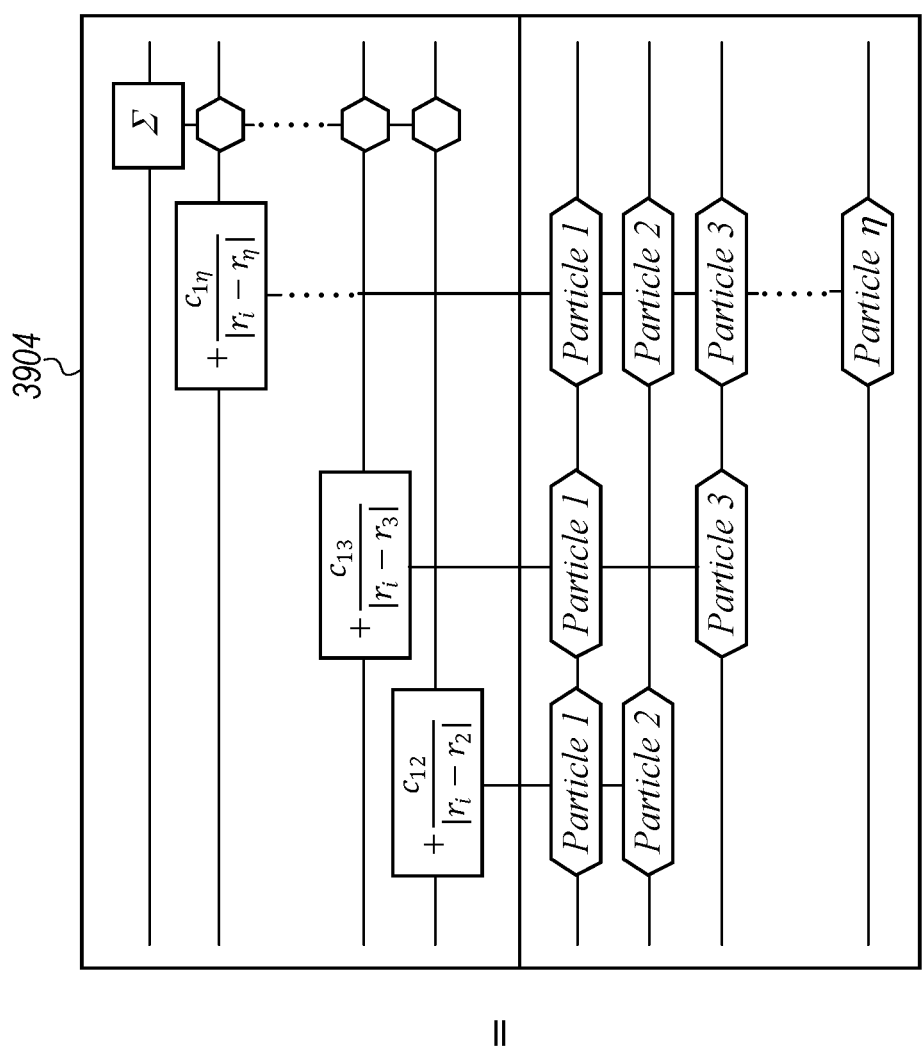
FIG. 25 is a quantum circuit diagram illustrating a parallelized method for computing the total system potential energy, according to some embodiments.
Figure 26:
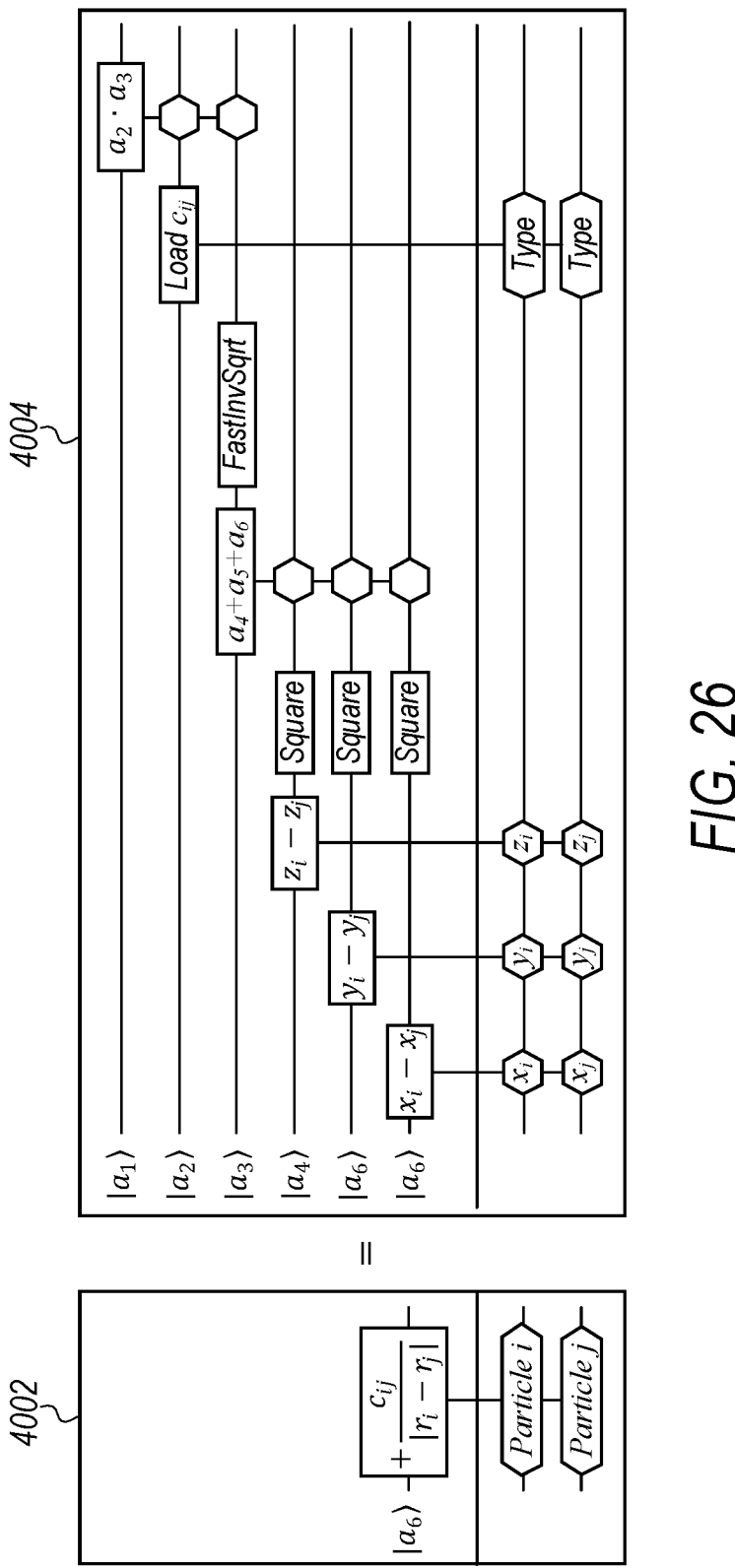
FIG. 26 is a quantum circuit diagram illustrating a parallelized version of a single term of the potential energy calculation, according to some embodiments.

The wall-clock runtime of a quantum computation is an important metric for computational efficiency. To reduce the overall runtime, it may be desirable for the computation to be parallelizable. Since the computation consists of many independent additions, every qubitization step is highly parallelizable. While the version of the potential-energy circuit presented herein looks very sequential, it may implemented as a parallel circuit simply by computing all two-particle terms individually before adding them up, as shown in FIG. 25. This utilizes extra workspace, but may also be used to remove some un-computation operations to save some of the Toffoli gates (roughly half), as shown in FIG. 26.

Accordingly, the potential-energy part has a reaction depth of $\mathcal{O}(\log \eta)$. The only other part that scales with η is the SwapUp operation, which has a log depth by default. With linear-depth arithmetic, the operations have a $\mathcal{O}(poly \log(N))$ scaling with the number of orbitals. Log-depth arithmetic can, in principle, turn this into a log log N scaling. The total depth then scales with $\mathcal{O}(\eta \cdot E_{cutoff} \cdot t \cdot \log \eta \cdot \log N)$ for a time evolution with time t.

Smaller Block-Encoding Circuit with Worse Scaling

Figure 27:
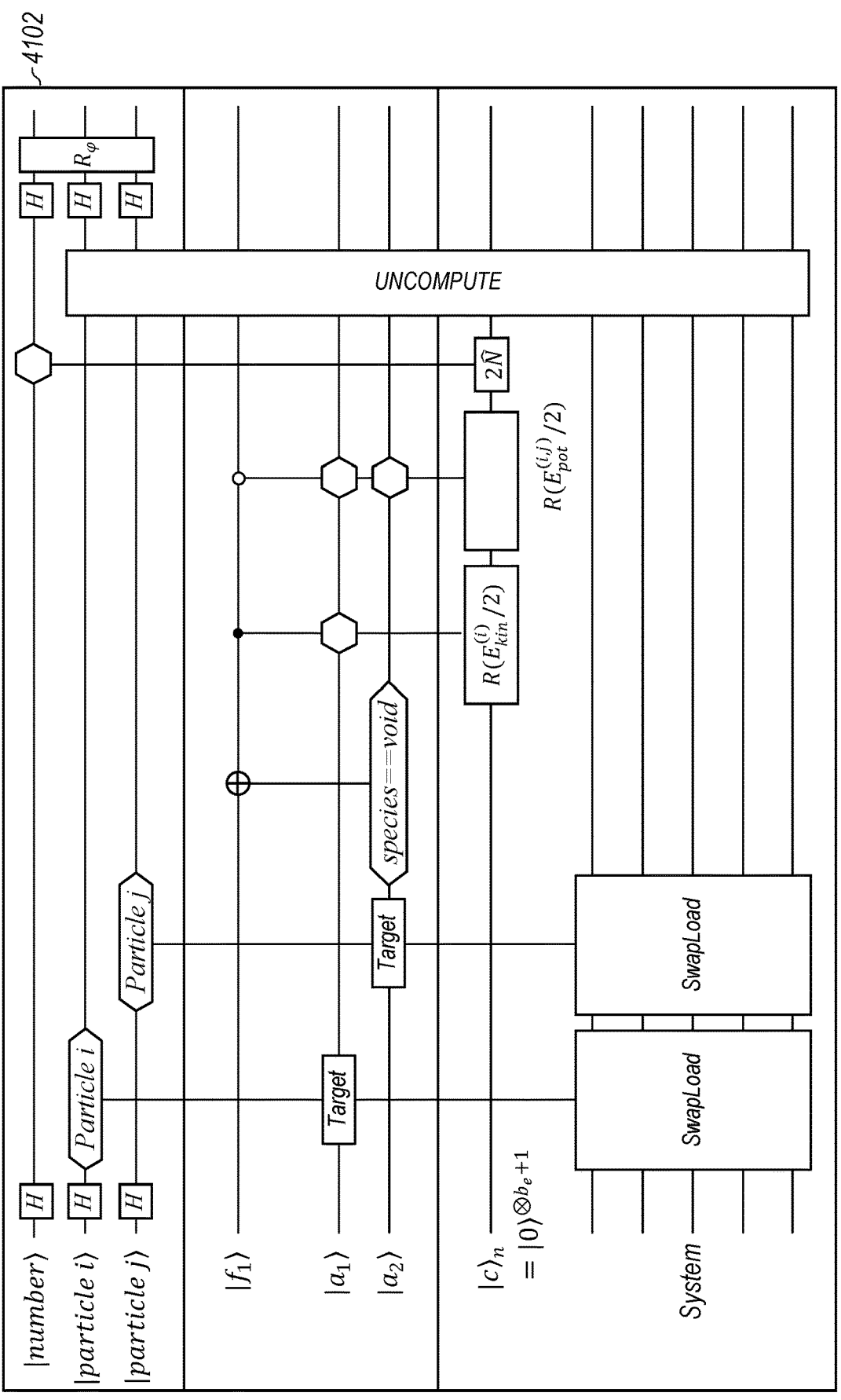
FIG. 27 is a quantum circuit diagram illustrating a qubitization time evolution operator that implements a per-term energy cutoff, according to some embodiments.

In some embodiments, a similar method is constructed with much cheaper qubitization operators. This can be achieved by replacing the per-particle high-energy cutoff with a per-term cutoff, such that each two-particle Coulomb interaction is subject to the cutoff. A corresponding circuit to implement a per-term cutoff is illustrated in FIG. 27.

While the number of operations of the potential-energy computation no longer scales with η, the qubitization operator still has a cost linear in η due to the cost of the SwapLoad (which contains a SwapUp). In addition, since we now select over all pairs of particles (due to replacing the per-particle cutoff with a per-term cutoff), the λ factor increases from $\lambda=2\eta \cdot E_{cutoff}$ to $\lambda=\eta^2 \cdot E_{cutoff}$, which increases the number of qubitization steps utilized by a factor of 1. Also, the per-term cutoff $E_{cutoff}$ may be higher than the per-particle cutoff, since the per-term cutoff does not benefit from the cancellation of strong Coulomb repulsion with strong Coulomb attraction.

Interacting Electrons and Ions

Simulations of large quantum systems with many interacting particles often contain particles that remain in almost the same state bound to another particle throughout the simulation. This may be the case, e.g., for the core (non-valence) electrons of large atoms, which remain tightly bound to the nucleus and therefore may not contribute to the chemical properties of the system in a meaningful way.

In some embodiments, as an approximation to decrease the cost of the computation, such particles may be treated as "frozen particles" that do not experience any dynamics. Each frozen particle may be bound to one of the $\eta$ "dynamic particles" of the simulation, where each dynamic particle j has $\eta_j$ associated frozen particles with positions $r_{jk}$ and charges $q_{jk}$. The Hamiltonian in this case may be represented as follows:

$$H = \sum_{i=1}^{\eta} E_{kin}^{(i)} + E_{pot}^{(i)} \tag{41}$$

$$E_{kin}^{(i)} = \frac{p_{i,x}^2 + p_{i,y}^2 + p_{i,z}^2}{2m_i} \tag{42}$$

$$E_{pot}^{(i)} = \sum_{j \neq i}^{\eta} \left( \frac{q_i q_j}{8\pi\varepsilon_0} \frac{1}{|r_i - r_j|} + \sum_{k=1}^{\eta_j} \frac{q_i q_{jk}}{4\pi\varepsilon_0} \frac{1}{|r_i - r_{jk}|} \right). \tag{43}$$

To summarize:

Frozen particles do not have a kinetic energy term.

Frozen particles do not interact with one another.

Frozen particles interact with dynamic particles, and therefore change the cost of the potential energy term from scaling with $\eta$ to scaling with $\eta + \eta_{frozen}$, where $\eta_{frozen}$ is the number of frozen particles.

Frozen particles do not contribute to the scaling of A and therefore do not increase the total number of qubitization steps.

The motivation for considering frozen particles is that the approximation reduces utilized qubits and operations. Instead of storing the state of all nuclei and all electrons, the state of all nuclei and only the valence electrons may be stored. In addition, one set of core electrons are kept that are initialized in a specific state corresponding to the (classically) known orbitals of the core electrons centered around $\vec{r} = 0$. Whenever a particle i interacts with a nucleus at position $\vec{r}_j$, these core electrons are shifted by $\vec{r}_j$ and contribute to the interaction with particle i.

Advantageously, this saves qubits because instead of storing the state of $n_{core} \cdot n_{ions}$ core electrons of $n_{ions}$ ions, only one set of $n_{core}$ frozen electrons is utilized that is shared by all $n_{ions}$ ions. Note that each ion type requires its own set of frozen core electrons, since the orbitals differ from ion to ion.

Implementing frozen particles involves modest modifications to the computation. Consider an example system consisting of electrons, lithium ions and phosphorus ions. While this suggests three types of particles, we will instead consider four types:

Type 00: Void

Type 01: Electron

Type 10: Li ion

Type 11: Pion

Figure 28:
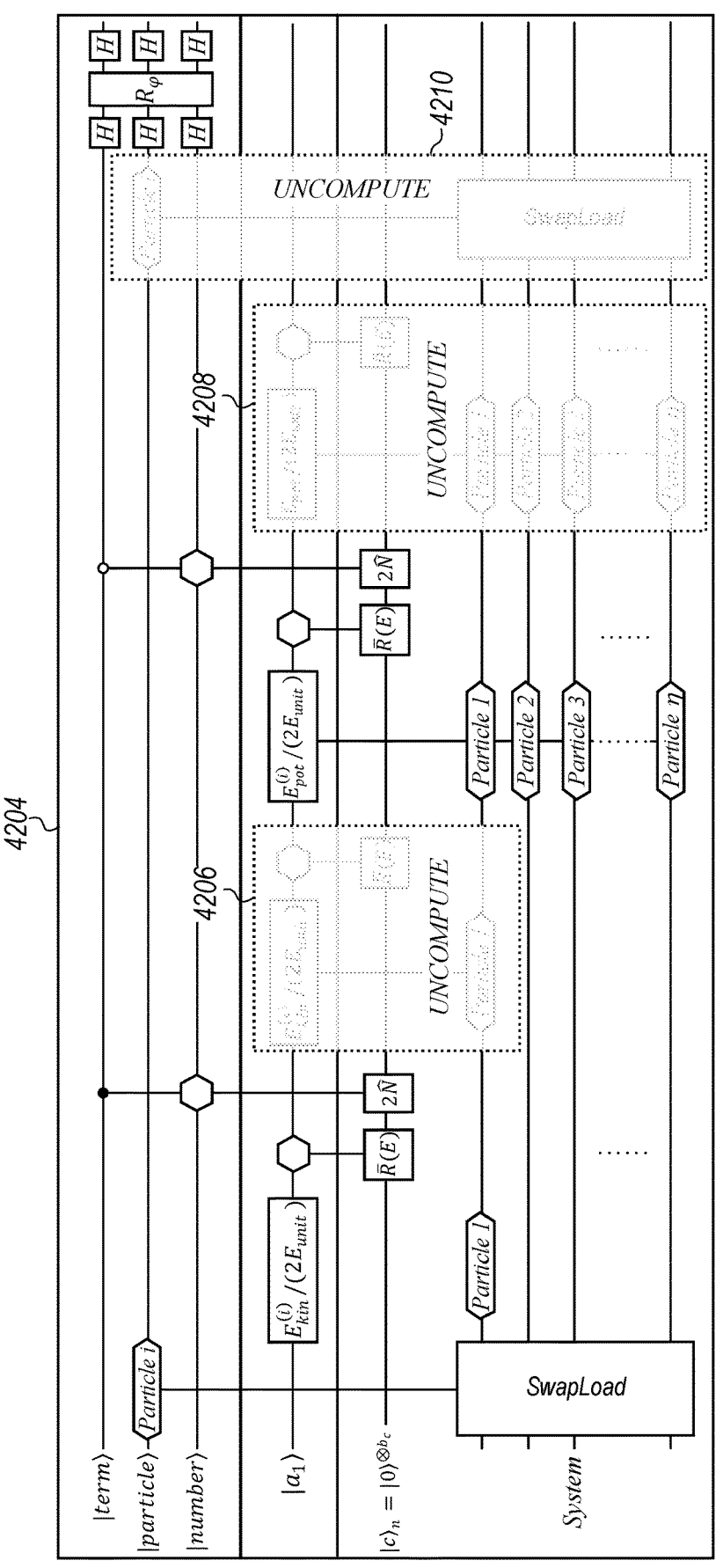
FIG. 28 is a quantum circuit diagram illustrating a qubitization time evolution operator that incorporates frozen particles, according to some embodiments.
Figure 29:
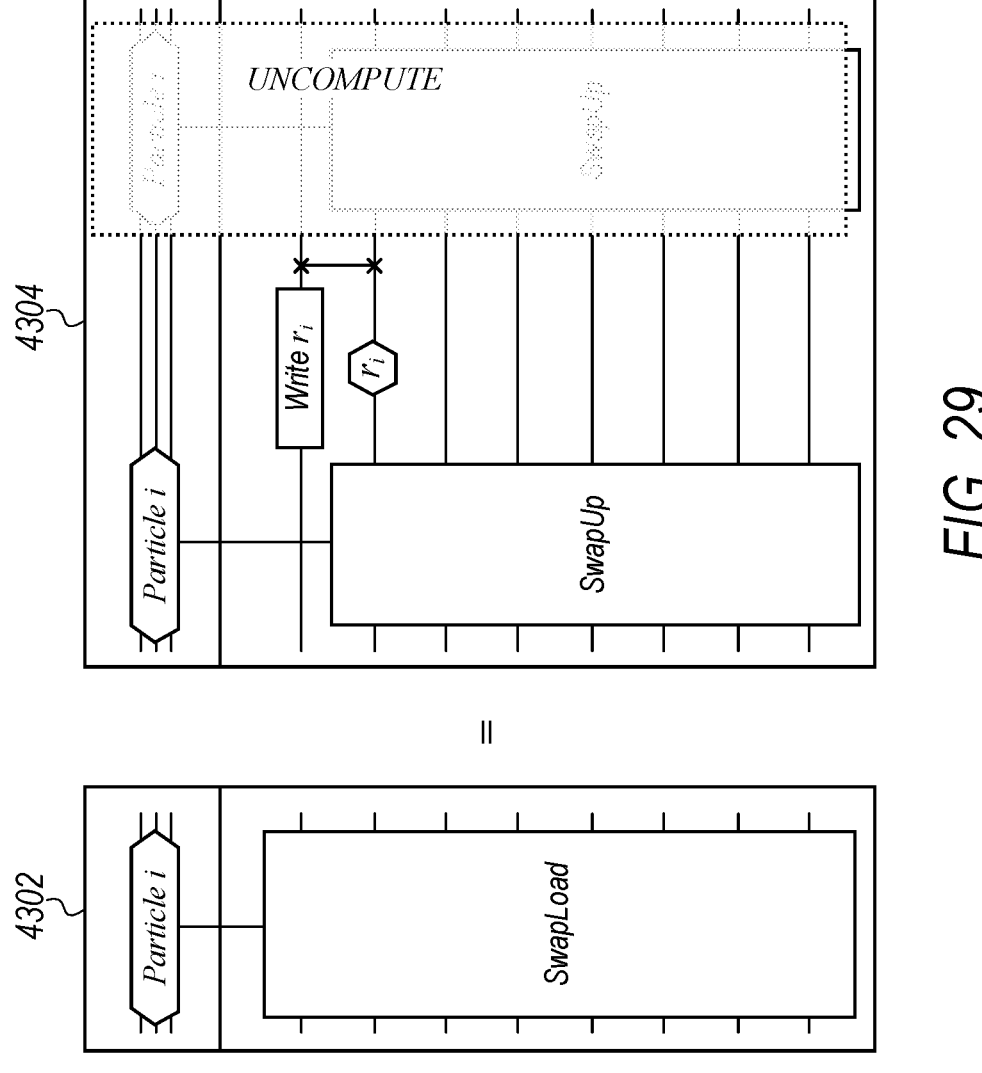
FIG. 29 is a quantum circuit diagram illustrating a SwapLoad operation, according to some embodiments.

Instead of $\eta$ particles, we will encode $\eta + 1$ particles, where particle 1 is a "void" particle. A void particle is a neutrally charged particle with x=y=z=0 that is used as a placeholder. The modified circuit is illustrated in FIG. 28. As illustrated, the initial SwapUp is replaced by a SwapLoad. This is a similar operation that consists of two SwapUps and a swap, and is illustrated in the circuit shown in FIG. 29.

The SwapLoad operation swaps the i-th non-void particle with particle 1 (which is a void particle) without changing the order of all other particles. Moreover, it copies the position of the i-th particle to the void particle. The motivation behind preserving the order of all particles is that after the SwapLoad still know the type of each particle in each position is still known (except position I and the void particle).

Figure 30:
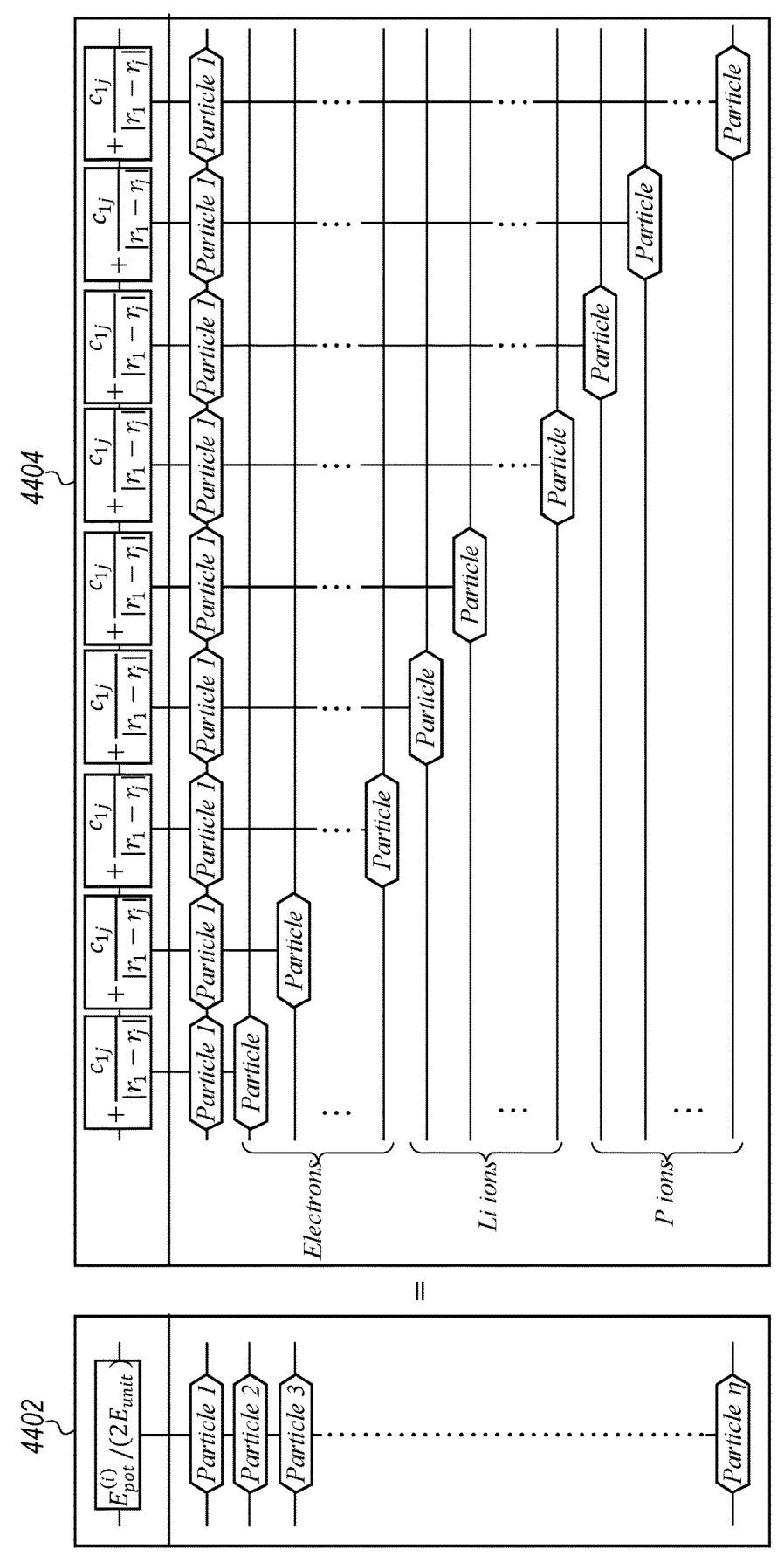
FIG. 30 illustrates a quantum circuit configured to compute the total system potential energy for a system with frozen particles, according to some embodiments.

While the kinetic-energy computation is unchanged, the potential-energy computation can now $b_e$ written as illustrated in the circuit shown in FIG. 30.

Figure 31:
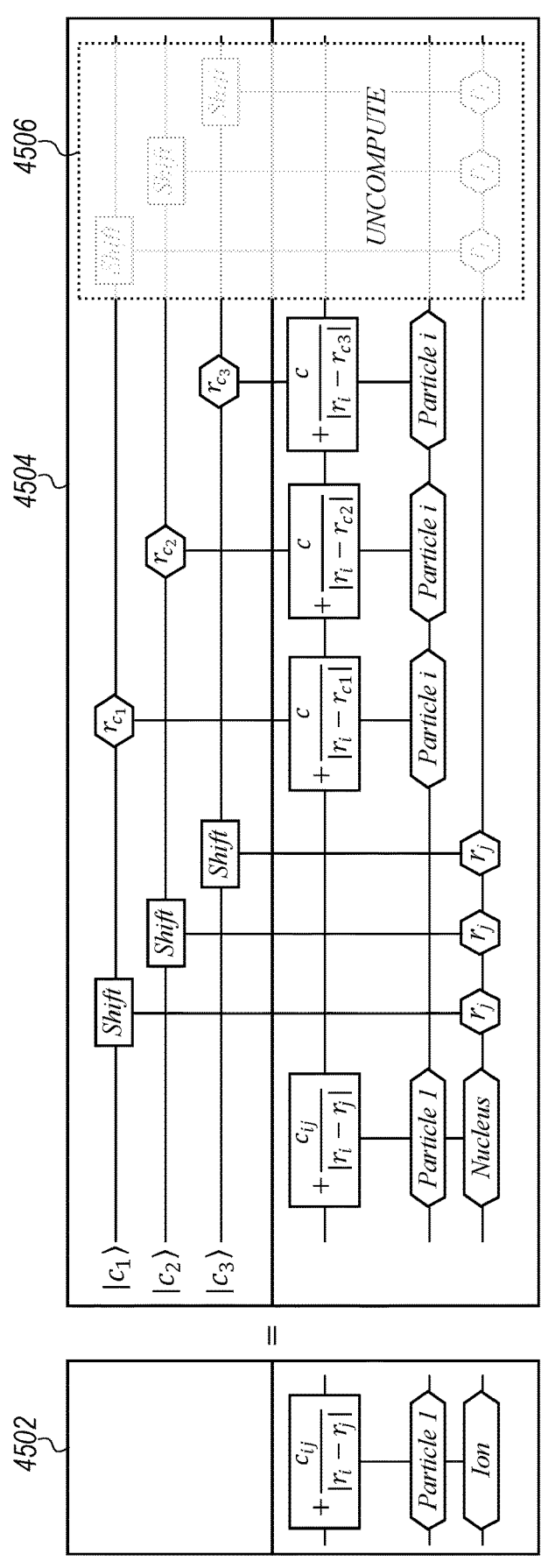
FIG. 31 illustrates a quantum circuit configured to compute a single term of the potential energy for a system with frozen particles, according to some embodiments.

For interactions with electrons, the operation is still the same as before, where we use a charge of q=0 for void particles. For interactions with ions, we have additional operations, as shown in the circuit illustrated in FIG. 31.

Whenever a particle interacts with an ion, it first interacts with the nucleus and then with its frozen electrons. These electrons are stored as constants, of which there are three in the example shown in FIG. 31. The positions of the frozen electrons are shifted to $b_e$ centered around the nucleus at $r_j$, after which their Coulomb terms are computed. The frozen electrons are then shifted back to the origin. Note that the ion may be the void particle that is now in the position of particle 1. In this case, this circuit implements the Coulomb interaction of the nucleus with its own frozen electrons.

Figure 32:
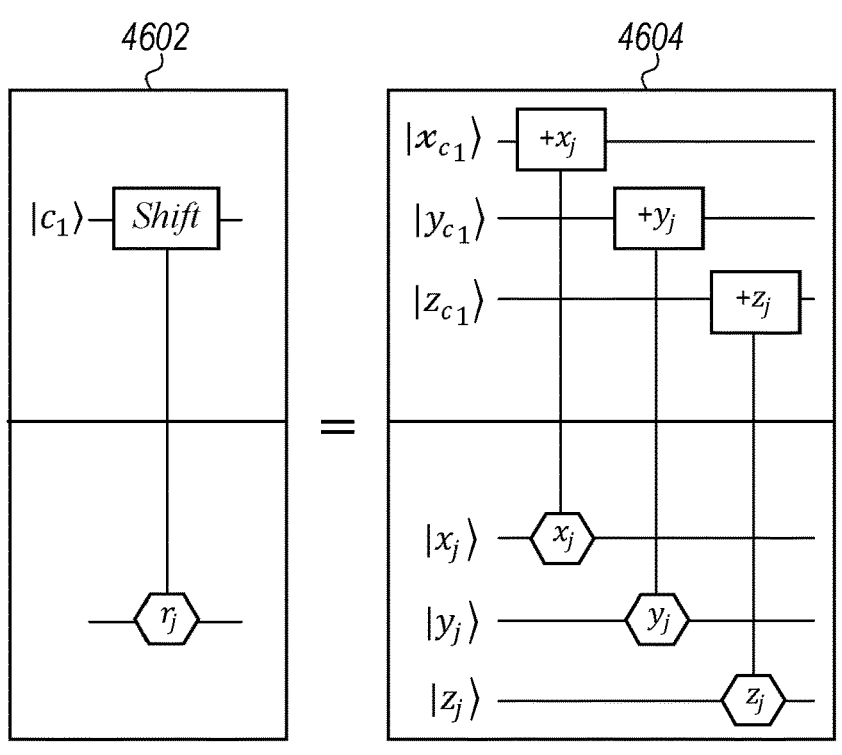
FIG. 32 is a quantum circuit diagram illustrating a shift operation, according to some embodiments.

Because frozen electrons are centered around the origin, the shift operations each consist of three additions, as shown in the circuit illustrated in FIG. 32. In total, the addition of frozen particles increases the number of operations in the Coulomb-interaction term from scaling with $\eta$ to scaling with $\eta + \eta_{frozen}$.

To illustrate the possible resource savings of these embodiments, consider a simulation of 100 silicon atoms. Silicon has 14 electrons. In total, this simulation involves $100 \cdot (14+1) = 1500$ particles. If we freeze the 10 inner electrons and only keep the 4 valence electrons as dynamic particles, we reduce the number of dynamic particles by a factor of 3 to $100 \cdot (4+1) = 500$ particles. In addition, only 10 frozen electrons are kept as constants. Moreover, since the number of particles in the Hamiltonian is reduced by a factor of 3, the number of qubitization steps is also reduced roughly by a factor of 3, as $\lambda$ is decreased. For very big atoms, it may be desirable to make additional approximations such as absorbing inner core electrons into the nucleus by decreasing its charge.

Note that frozen particles may be stored using fewer qubits than dynamic particles, since they are typically localized around the origin. For example, if $b_j = 6$ and the simulation takes place in a real-space grid of size 64×64×64, but the amplitude of frozen electrons is negligible outside a box of size 16×16×16, then frozen electrons only utilize 4 qubits per coordinate instead of 6 qubits.

Interacting Particles Coupled to a Heat Bath

In some embodiments, variations of the methods described herein may be applied to study systems at finite temperature. A large number of problems of interest may be phrased as the measurement of (relatively simple) time-dependent observables at finite temperatures.

Examples include:

Chemical reaction rates: It may be desired to determine the positions of all particles (i.e., reaction products) after some time t in a system initially consisting of reactant molecules at a finite temperature T.

Crystal structure prediction: It may be desired to determine the positions of all particles after a sufficiently long time t in a system of particles that is coupled to a low-temperature environment? This is also equivalent to Gibbs-state preparation (and, for T=0, ground-state preparation).

Electrical resistivity of materials at finite temperatures: After preparing a Gibbs state, all electron momenta may be shifted by a constant amount, effectively applying a quench. In this situation, it may be desired to determine the average electron momentum after time-evolving the system (still coupled to a heat bath) for some time t. The higher the resistivity, the more current will dissipate.

Figure 33:
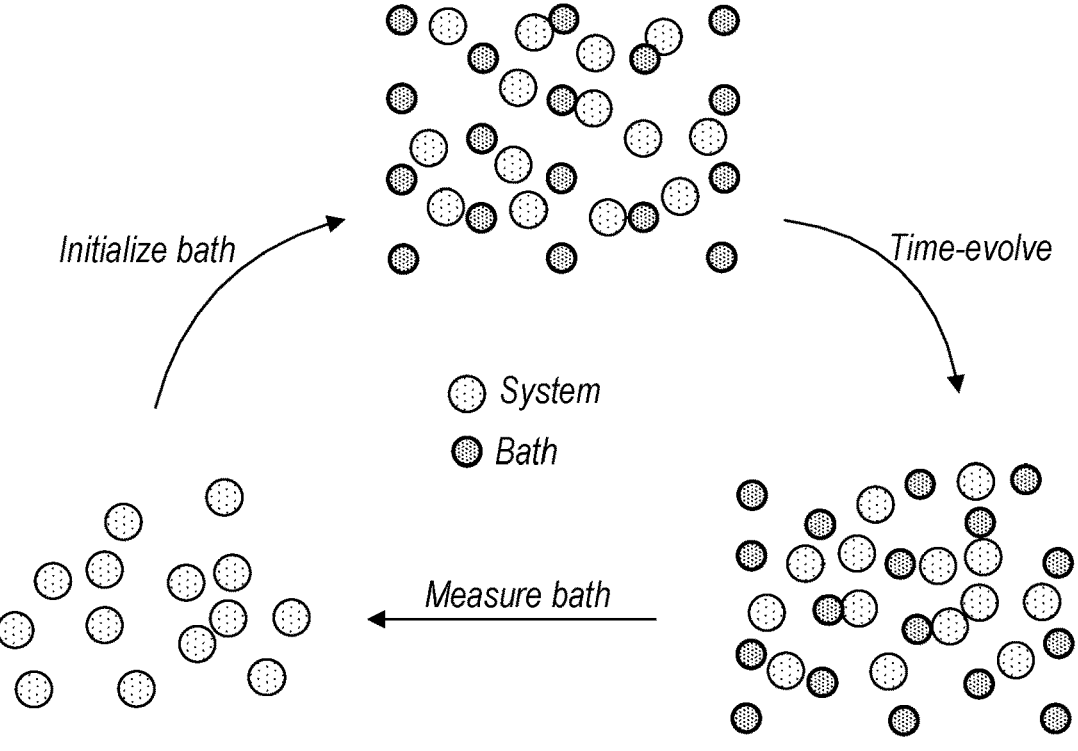
FIG. 33 is a schematic diagram illustrating time evolution of a particle interacting with a heat bath, according to some embodiments.

Systems at finite temperature may be simulated by extending the system to add a heat bath (i.e., an additional simple system initialized in a known finite-temperature state) and weakly coupling the original system to the heat bath. The resulting method to keep a system at a fixed temperature is then similar to a heat pump, as shown schematically in FIG. 33.

The bath may be initialized in a known finite-temperature state. Such states are thermal ensembles described by a density matrix, so they do not correspond to pure states. Instead, a pure state from the ensemble may be chosen randomly according to the probabilities corresponding to the finite-temperature ensemble. The full system is time-evolved, transferring heat from the system to the bath (or the other way round). After some time, the bath is measured. The measurement outcomes may be used to determine the temperature of the bath and, by extension, the system. This may be used to determine if a steady state had been reached, or to use the bath as a thermometer. Next, a fresh bath is prepared and the process repeats.

In various embodiments, different options may be implemented to model a heat bath by introducing additional particle types and Hamiltonian terms. The following sections describe some of these options in detail, including the Caldeira-Legget model, phonons, and bath particles with simple Hamiltonians.

Caldeira-Leggett Model

One popular toy model of a heat bath is the Caldeira-Legget model, a collection of harmonic oscillators with different eigenfrequencies:

$$H_{bath} = \sum_i \left( \frac{p_i^2}{2m} + \frac{1}{2} m\omega_i^2 x^2 \right) \tag{44}$$

The system couples linearly to the bath:

$$H_{system-bath} = \sum_{systemparticlesi} x_i \sum_{bathoscillatorsj} C_j x_j \tag{45}$$

where $C_j$ are coupling constants. All terms may be implemented using one multiplication. However, this is a toy model and the couplings are unphysical (e.g., they are not translationally invariant), so this approach may have limitations in a many-particle system.

Phonons

For many systems found in nature, the heat bath consists of a vibrating crystal lattice. We may replicate this in the quantum simulation by introducing a "background lattice" that weakly couples to the system. Here, the bath can be described by a regular 3D grid of coupled harmonic oscillators:

$$H_{bath} = \sum_i \frac{p_i^2}{2m} + \sum_{neighborsi,j} \frac{1}{2} m\omega^2 (\vec{r}_i - \vec{r}_j)^2 \tag{46}$$

The excitations of this system are phonons, lattice vibrations with a linear dispersion (at least at low energies). In a real physical system, electrons couple to the ions of the crystal lattice via the Coulomb interaction:

$$H_{system-bath} = \kappa \cdot \sum_{systemi} \sum_{bathj} \frac{1}{|r_i - r_j|}. \tag{47}$$

When used as a heat bath, the coupling constant $\kappa$ should be low enough as to not perturb the system too much. As described above, the calculation of the Coulomb potential is an expensive operation, so it may be desirable to avoid replicating this particular physical mechanism, at least in some embodiments. Instead, we may consider alternative system-bath coupling terms that are cheaper to implement, e.g., a piecewise linear potential described below.

In some embodiments, it may be desirable to utilize separate energy cutoffs for system-bath coupling terms, as they may be chosen to be lower than other cutoffs. Furthermore, a variable total energy cutoff may be used that decreases as the system is cooled down, resulting in cheaper qubitization steps at lower temperatures.

Bath Particles with Simple Hamiltonians

In some embodiments, a Hamiltonian that requires particularly simple arithmetic such as linear functions may be used to model a heat bath. Bath particles with a linear dispersion have the following Hamiltonian:

$$H_{bath} = \hbar c \cdot \Sigma_i |p_i|. \tag{48}$$

In some embodiments, the bath may be initialized by preparing multiple bath particles in randomly chosen states $|p_i\rangle + |-p_i\rangle$ according to the appropriate probability distribution obtained from $e^{-\beta H_{bath}}$. The system-bath coupling may be chosen to be a piecewise linear function such as the following:

$$H_{system-bath} = \kappa \cdot \Sigma_{systemi} \Sigma_{bathj} \max(0, 1-|x_i-x_j|) \tag{49}$$

These terms are somewhat reminiscent of particles in a time-dependent electric field, where each bath particle with a frequency of $\omega_i = \hbar c p_i$ corresponds to an electric field oscillating with a frequency $\omega_i$. If bath and system-bath Hamiltonians may be implemented using only linear terms, a heat bath may be added to a simulation with very little additional cost.

Regardless of the choice of heat bath, the methods described herein may be used to implement the time evolution operator of such bath and system-bath Hamiltonians using the appropriate arithmetic operations.

Additional Embodiments

The following numbered paragraphs describe additional embodiments.

In some embodiments, a method is performed by a quantum computing system. The method comprises storing, in a non-transitory computer-readable memory medium, a model Hamiltonian that approximates a first quantization Hamiltonian of a physical system, wherein the physical system comprises a plurality of particles, wherein the first quantization Hamiltonian comprises a plurality of first quantization energy operators, wherein the model Hamiltonian comprises a plurality of energy terms corresponding to respective ones of the plurality of first quantization energy operators, and wherein each energy term comprises a respective energy operator, a respective energy register operator, and a respective inverse energy operator.

The method further comprises approximating a ground state energy of the physical system by performing a quantum computation on a plurality of qubits of the quantum computing system using the model Hamiltonian.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure may be modified or omitted and that other elements not shown or described may be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first switch could be termed a second switch, and, similarly, a second switch could be termed a first switch, without departing from the scope of the various described embodiments. The first switch and the second switch are both switches, but they are not the same switch unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
by a quantum computing system:
    storing, in a non-transitory computer-readable memory medium, a model Hamiltonian that approximates a first quantization Hamiltonian of a physical system, wherein the physical system comprises a plurality of particles, wherein the first quantization Hamiltonian comprises a plurality of first quantization energy operators, wherein the model Hamiltonian comprises a plurality of energy terms corresponding to respective ones of the plurality of first quantization energy operators, and wherein each energy term comprises a respective energy operator, a respective energy register operator, and a respective inverse energy operator;
    emulating the physical system by performing a quantum computation on a plurality of qubits of the quantum computing system to emulate time evolution using the model Hamiltonian.

2. The method of claim 1,
wherein emulating the physical system comprises:
    constructing a model system comprising a combination of a wavefunction of the physical system and an energy register; and
    applying a time evolution operator comprising the model Hamiltonian to the model system.

3. The method of claim 2,
wherein applying the time evolution operator comprising the model Hamiltonian to the model system comprises implementing qubitization to emulate the time evolution of the physical system with a plurality of qubitization operators.

4. The method of claim 3,
wherein implementing qubitization comprises, for each of the plurality of qubitization operators and for each of the plurality of energy terms:
    applying the respective energy operator to populate the energy register with an energy value;
    applying the respective energy register operator to extract the energy value from the energy register; and
    applying the respective inverse energy operator to return the model system to a state prior to application of the respective energy operator.

5. The method of claim 3,
wherein implementing qubitization comprises, for each of a plurality of phases $\varphi_i$, applying a sequence of subroutines comprising a SELECT subroutine, an inverse PREPARE subroutine, an $R_\varphi$ operator, and a PREPARE subroutine.

6. The method of claim 1,
wherein the model Hamiltonian discretizes an energy of the full Hamiltonian and implements an energy cutoff on each of the plurality of particles of the physical system.

7. The method of claim 6,
wherein the energy cutoff comprises a maximum potential energy and a maximum kinetic energy for each of the plurality of particles of the physical system.

8. The method of claim 6, further comprising:
determining a relationship between the energy cutoff, an energy uncertainty of the model Hamiltonian, and a number of repetitions of a qubitization operator of the quantum computation; and
determining the energy cutoff based at least in part on the energy uncertainty and the number of repetitions of the qubitization operator.

9. The method of claim 6,
wherein the energy cutoff has the form:

$$R(\epsilon) = \begin{cases} 2^{b_e-1} - 1 & \text{if } \epsilon \geq E_{cutoff}/2 \\ -2^{b_e-1} & \text{if } \epsilon < -E_{cutoff}/2 \\ \text{round}\left(\dfrac{\epsilon}{E_{unit}}\right) & \text{else} \end{cases}.$$

10. The method of claim 1,
wherein the energy operators comprise:
 a plurality of kinetic energy operators, wherein each kinetic energy operator corresponds to a respective particle of the plurality of particles; and
 a plurality of potential energy operators that correspond to interaction energies between respective pairs of the plurality of particles.

11. The method of claim 1,
wherein the physical system comprises one of:
 a system of identical Coulomb-interacting particles;
 a system of Coulomb-interacting ions with frozen core electrons; or
 a system of interacting particles coupled to a heat bath.

12. The method of claim 1,
wherein the first quantization Hamiltonian has the form $$H = \sum_{i=1}^{\eta} E_{kin}^{(i)} + E_{pot}^{(i)},$$

where $$E_{kin}^{(i)} = \frac{p_{i,x}^2 + p_{i,y}^2 + p_{i,z}^2}{2m_i} \text{ and } E_{pot}^{(i)} =$$

$$\sum_{j\neq i}^{\eta} \frac{q_i q_j}{8\pi\varepsilon_0} \frac{1}{\sqrt{(x_i-x_j)^2+(y_i-y_j)^2+(z_i-z_j)^2}}, \text{ where } E_{kin}^{(i)}$$

and $$E_{pot}^{(i)}$$

are the kinetic and potential energy of particle i, and wherein the model Hamiltonian has the form $$\tilde{H} = E_{unit} \cdot \sum_{i=1}^{\eta} \left( U_{kin}^{(i)\dagger} \cdot 2\hat{N} \cdot U_{kin}^{(i)} + U_{pot}^{(i)\dagger} \cdot 2\hat{N} \cdot U_{pot}^{(i)} \right).$$

13. A non-transitory computer-readable memory medium storing program instructions which, when executed by a processor, cause a quantum computing system to:
 store, in a non-transitory computer-readable memory medium, a model Hamiltonian that approximates a first quantization Hamiltonian of a physical system, wherein the physical system comprises a plurality of particles, wherein the first quantization Hamiltonian comprises a plurality of first quantization energy operators, wherein the model Hamiltonian comprises a plurality of energy terms corresponding to respective ones of the plurality of first quantization energy operators, and wherein each energy term comprises a respective energy operator, a respective energy register operator, and a respective inverse energy operator; and
 emulate the physical system by performing a quantum computation on a plurality of qubits of the quantum computing system to emulate time evolution using the model Hamiltonian.

14. The non-transitory computer-readable memory medium of claim 13, wherein, in emulating the physical system, the program instructions are executable to cause the quantum computing system to:
 construct a model system comprising a combination of a wavefunction of the physical system and an energy register; and
 apply a time evolution operator comprising the model Hamiltonian to the model system.

15. The non-transitory computer-readable memory medium of claim 14,
wherein applying the time evolution operator comprising the model Hamiltonian to the model system comprises implementing qubitization to emulate the time evolution of the physical system with a plurality of qubitization operators.

16. The non-transitory computer-readable memory medium of claim 13,
wherein the model Hamiltonian discretizes an energy of the full Hamiltonian and implements an energy cutoff on each of the plurality of particles of the physical system,
wherein the energy cutoff comprises a maximum potential energy and a maximum kinetic energy for each of the plurality of particles of the physical system.

17. A quantum computing system, comprising:
 a non-transitory computer-readable memory medium;
 a plurality of qubits; and
 a controller,
 wherein the quantum computing system is configured to:
  store, in the non-transitory computer-readable memory medium, a model Hamiltonian that approximates a first quantization Hamiltonian of a physical system, wherein the physical system comprises a plurality of particles, wherein the first quantization Hamiltonian comprises a plurality of first quantization energy operators, wherein the model Hamiltonian comprises a plurality of energy terms corresponding to respective ones of the plurality of first quantization energy operators, and wherein each energy term comprises a respective energy operator, a respective energy register operator, and a respective inverse energy operator;
  perform a quantum computation on the plurality of qubits using the model Hamiltonian.

18. The quantum computing system of claim 17,
wherein the quantum computation emulates time evolution of the physical system using the model Hamiltonian.

19. The quantum computing system of claim 17,
wherein the quantum computation approximates a ground state energy of the physical system.

20. The quantum computing system of claim 17,
wherein, in emulating the physical system, the quantum computing system is configured to:
 construct a model system comprising a combination of a wavefunction of the physical system and an energy register; and
 apply a time evolution operator comprising the model Hamiltonian to the model system,
wherein applying the time evolution operator comprising the model Hamiltonian to the model system comprises implementing qubitization to emulate the time evolution of the physical system with a plurality of qubitization operators.

* * * * *